(12) United States Patent
Fountaine

(10) Patent No.: US 10,908,874 B2
(45) Date of Patent: *Feb. 2, 2021

(54) ENHANCED CONTROL AND SECURITY OF A VOICE CONTROLLED DEVICE

(71) Applicant: THE IDEALOGIC GROUP, INC., Las Vegas, NV (US)

(72) Inventor: Dennis Fountaine, San Diego, CA (US)

(73) Assignee: The Idealogic Group, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/355,709

(22) Filed: Mar. 16, 2019

(65) Prior Publication Data

US 2019/0212976 A1    Jul. 11, 2019

Related U.S. Application Data

(63) Continuation of application No. 15/585,288, filed on May 3, 2017, now Pat. No. 10,282,166.

(51) Int. Cl.
| | |
|---|---|
| *G10L 15/26* | (2006.01) |
| *G06F 3/16* | (2006.01) |
| *G10L 21/06* | (2013.01) |
| *G06F 16/683* | (2019.01) |
| *H04M 1/60* | (2006.01) |
| *G10L 15/22* | (2006.01) |

(52) U.S. Cl.
CPC .............. *G06F 3/167* (2013.01); *G06F 3/165* (2013.01); *G06F 16/683* (2019.01); *G10L 15/26* (2013.01); *G10L 21/06* (2013.01); *G10L 15/22* (2013.01); *H04M 1/6066* (2013.01)

(58) Field of Classification Search
CPC .......... G10L 21/02; G10L 15/20; G10L 15/22
USPC ........................................................ 704/275
See application file for complete search history.

(56) References Cited

U.S. PATENT DOCUMENTS

| | | | | |
|---|---|---|---|---|
| 4,144,582 A | * | 3/1979 | Hyatt ................. | B60R 16/0373 704/203 |
| 7,949,519 B2 | * | 5/2011 | Iwaki ................. | G01C 21/3629 704/205 |
| 2003/0093281 A1 | * | 5/2003 | Geilhufe ................. | G10L 13/00 704/275 |

* cited by examiner

*Primary Examiner* — Daniel Abebe
(74) *Attorney, Agent, or Firm* — Jensen-Haxel Law

(57) ABSTRACT

Disclosed is a method, a device, a system and/or a manufacture of control and security of a voice controlled device. In one embodiment, an apparatus includes a signal input for receiving a command signal and a soundwave damper to dampen a sound receiving capability of a voice controlled device. The voice controlled device is capable of initiating a responsive action in response to a voice command. A processor determinations that the command signal is associated with the voice command and in response to the determination generate with a speaker a soundwave carrying the voice command bypassing the soundwave damper such that the soundwave carrying the voice command is communicable to the microphone of the voice controlled device. The apparatus also includes a cap housing the speaker and optionally the soundwave damper. As an example, the soundwave damper may be a barrier, a flexible membrane, or a sound interference generator.

20 Claims, 20 Drawing Sheets

META SOUND CONTROL DEVICE 100

*FIG. 14*   INTERFACE COMMAND CONFIGURATION PROCESS FLOW

FIG. 15   SOUND INTERFACE OPERATION PROCESS FLOW

FIG. 16  META VOICE CONTROL PROCESS FLOW

CUSTOM WAKE WORD AND SPEECH PASS-TRHOUGH SPEECH ROUTING PROCESS FLOW

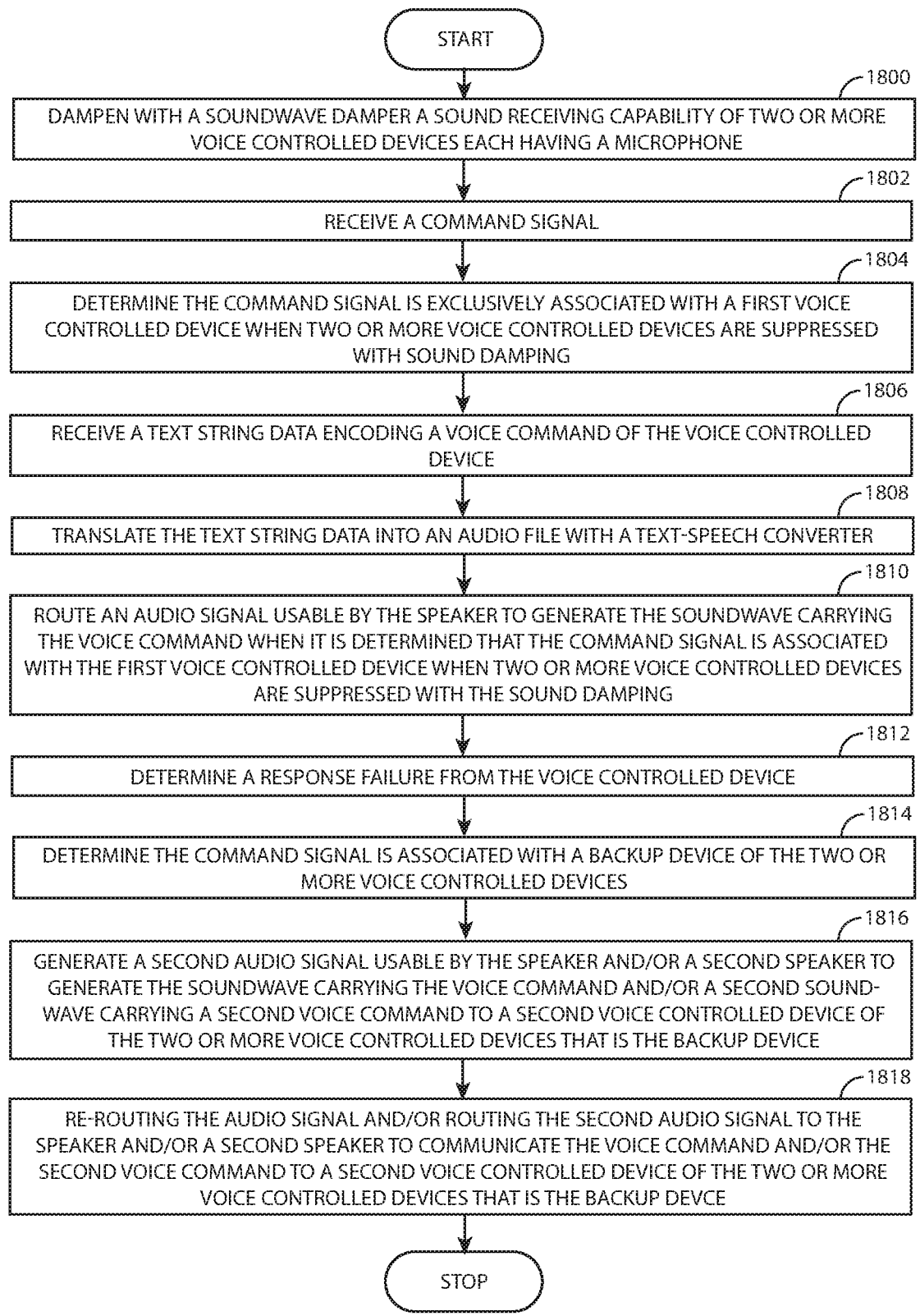
FIG. 18 VOICE CONTROLLED DEVICE BACKUP ROUTING PROCESS FLOW

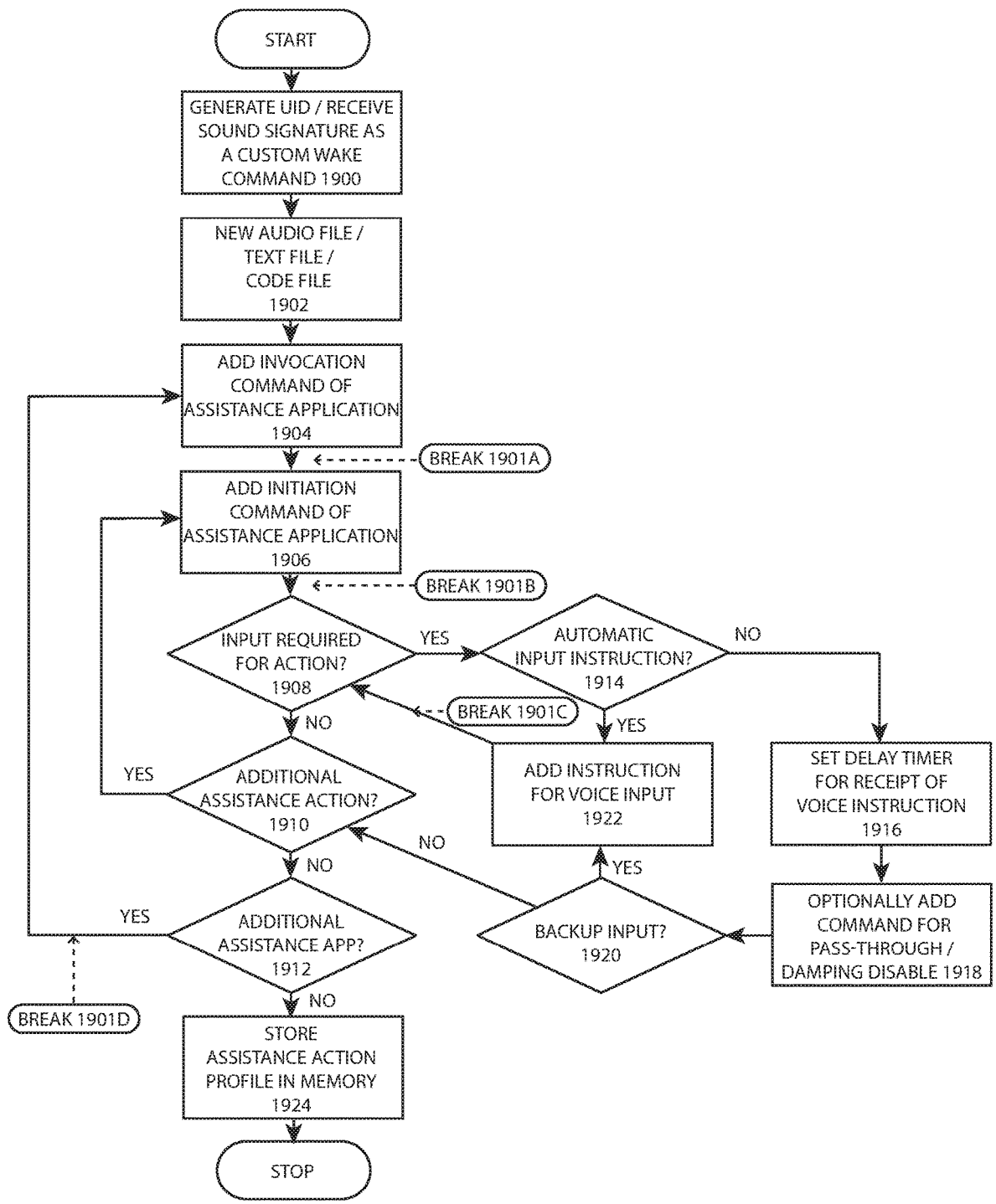
FIG. 19   ASSISTANCE ACTION PROFILE PROCESS FLOW

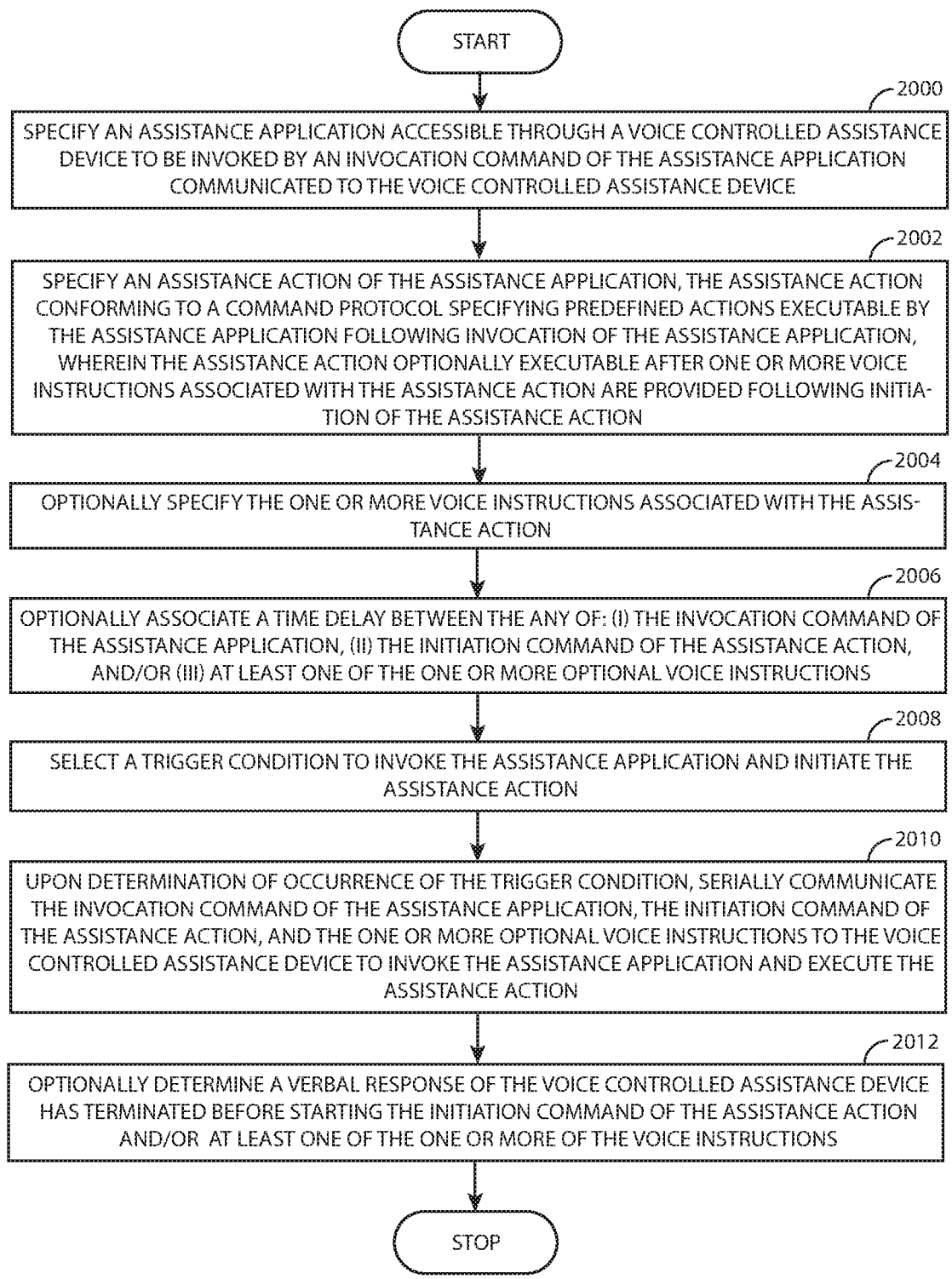
FIG. 20  AUTOMATED ASSISTANCE ACTION INITIATION PROCESS FLOW

ENHANCED CONTROL AND SECURITY OF A VOICE CONTROLLED DEVICE

CLAIMS OF PRIORITY AND CROSS REFERENCES TO RELATED APPLICATIONS

This patent application is a continuation of, and, claims priority from, and hereby incorporates by reference: U.S. utility patent application Ser. No. 15/585,288, titled 'ENHANCED CONTROL, CUSTOMIZATION, AND/OR SECURITY OF A SOUND CONTROLLED DEVICE SUCH AS A VOICE CONTROLLED ASSISTANCE DEVICE' filed on May 3, 2017.

FIELD OF TECHNOLOGY

This disclosure relates generally to data processing devices and, more particularly, to a method, a device, a system and/or a manufacture of enhanced control and security of a voice controlled device.

BACKGROUND

Sound controlled devices are devices that are controlled through a sound utilizing air as a sound communication medium. Some sound controlled devices respond to a distinct sound within their sound receiving environment (e.g., a human clap, a siren, a noise detected above a threshold level). Sound controlled devices respond to a simple voice command (e.g., "turn on", "turn off"). Some industrial control systems may include voice controlled components (e.g., a single-purpose emergency shutdown procedure for an industrial controller). Other sound controlled devices respond to voice commands and may be referred to as a voice controlled device. Another class of voice controlled device may use a complex speech interaction and/or a conversational interaction with a voice controlled assistant that is a computer program. This may allow for a natural interface for interaction between a user and more complex technology. The voice controlled assistant may respond to a question by a user with a piece of information and/or respond to a command of the user by taking an action. This voice controlled assistant may have an "artificial intelligence" personality. For example, the voice controlled assistant provided as an assistance service through the voice controlled assistance device may be Apple Siri, Microsoft Cortana, Google Assistant, Samsung Bixby, and/or Amazon Alexa.

For the voice controlled assistance service, a user may also be able to invoke specific assistance applications with an invocation command and initiate specific assistant actions with an initiation command. Each assistance action may require one or more additional voice instructions to voice inputs. The invocation command, the initiation command, and each voice instruction may be provided according to a voice command protocol of the assistance application.

However, some sound controlled devices may represent numerous use challenges for some users. A manufacturer of the sound controlled device and/or provider of a voice controlled assistance service may define a sound control protocol that does not suite a particular use case or use environment, e.g., receiving a sound command at a specific sound frequency in a location with a lot of noise at the sound frequency. In terms of a conversational instruction, the initiation command and the instructions may conform to a complex instance of the sound command protocol and/or the voice command protocol that is hard for the user to remember. The sound command protocol may be slow, requiring numerous instructions that reduce an advantage of utilizing a voice control, or be prone to failure or starting over if one instruction or command fails. In addition, multiple sound controlled devices within a shared sound communication environment (e.g., a single room) may conflict, especially where they may overlap in commands of their sound command protocols. While it may be advantageous to have access to multiple voice controlled assistance services due to differences in supported assistance applications, services, and/or capabilities, two or more voice controlled assistants sharing an environment may create confusion, for example the automated speech response of one voice controlled assistant misinterpreted as user speech by another.

Some sound controlled devices may also represent security and privacy concerns for some users. For example, the sound controlled device may connect to a remote server of a network to analyze a sound received within its sound receiving environment. A voice controlled assistance device may be actively "listening" to its sound receiving environment and relaying all sound received to a remote location for analysis. For example, the voice controlled assistant may analyze speech of the user with a speech recognition engine on a remote cloud commuting environment operated by a provider of the voice controlled assistance service. The user may be unsure of the data is recorded, stored, retained, subject to inspection, and/or utilized for advertising purposes. Further, a voice command protocol may be activated in ways unintended and outside of the control of the user, for example where a radio or television broadcast inadvertently (or intentionally) tries to trigger the voice controlled device. Similarly, a child of the user may learn to naturally speak to and utilize the voice controlled assistance device and may order unapproved products on the user's account and/or access inappropriate content.

As a result of one or more of these issues the user may be faced with a sound control protocol that may make use of the sound controlled device difficult, annoying and/or challenging, which may reduce sales or usage of a particular sound control product and/or service. Multiple sound controlled devices may not be able to adequately coincide within a shared sound communication environment, limiting the types of control, information, services, and/or assistance applications easily available to the user, also limiting sales and usage. Security and privacy conscious users may not purchase or continue use of sound controlled device products and/or services where they may have little or no control over how sound within their environment is transmitted and utilized.

SUMMARY

Disclosed are a method, a device, a system, and/or a manufacture of enhanced control and security of a voice controlled device.

In one embodiment, an apparatus includes a signal input for receiving a command signal and a soundwave damper to dampen a sound receiving capability of a voice controlled device. The voice controlled device is capable of initiating at least one of a responsive action in response to a voice command received on a microphone of the voice controlled device and a speech response of the voice controlled device. The apparatus includes a processor and a memory, and the memory includes an audio file encoding the voice command and computer-executable instructions.

When executed on the processor the computer readable instructions cause the processor to (i) transmit the command signal to a server for a determination that the command signal is associated with the voice command, and receive at least one of the voice command and the determination that the command signal is associated with the voice command and/or (ii) determine the command signal is associated with the voice command, and in response to a determination of input of the command signal, generating with a speaker a soundwave carrying the voice command capable of initiating at least one of a response action of the voice controlled device and the speech response of the voice controlled device.

The apparatus incudes the speaker, to bypass the soundwave damper such that the soundwave carrying the voice command is communicable to the microphone of the voice controlled device. The apparatus also includes a cap housing the speaker and optionally the soundwave damper.

The voice controlled device may be a voice controlled assistance device. The processor and the memory may be housed in a mobile device. The apparatus may further include a network interface controller, where the signal input is the network interface controller. The apparatus may have a memory further including computer-executable instructions that when executed on the processor causes the processor to associate the command signal with the voice command and receive the command signal from a mobile device through the network interface controller.

The apparatus may further include a base, an adjustable connector connecting the base and a cap and configured to allow the speaker and the soundwave damper to be adjusted proximate to the microphone of the voice controlled device, and a configuration lock at least one of securing a configuration of the adjustable connector. The cap may include a coupling to attach the cap to the voice controlled device such that the speaker is communicatively coupled to the microphone of the voice controlled device.

The soundwave damper may be a barrier shielding the microphone of the voice controlled device to reduce an ordinary sound receiving environment of the voice controlled device. The barrier may be a flexible membrane forming a seal around the microphone of the voice controlled device. The soundwave damper may be a sound interference generator.

The voice controlled device may be referred to as a first voice controlled device and the apparatus may include a second speaker and a second soundwave damper dampening a second voice controlled device. The memory may further include computer-executable instructions that when executed on the processor causes the processor to determine a relation data between the command signal and the first voice controlled device such that the first voice controlled device is to primarily receive the voice command associated with the command signal.

In another embodiment, a method includes dampening with a soundwave damper a sound receiving capability of a voice controlled assistance device having a microphone. The method receives a command signal and executes computer readable instructions to determine that the command signal is associated by a relation data to a voice command. The voice command is stored as an audio file in a memory. In response to the command signal, the method generates with a speaker a soundwave carrying the voice command. The voice command is capable of initiating a response action of the voice controlled assistance device and/or a speech response of the voice controlled assistance device. The soundwave damper is then bypassed to communicate the soundwave carrying the voice command from the speaker to the microphone of the voice controlled assistance device.

In yet another embodiment, a system includes a sound controlled device communicatively coupled to a sound recognition engine. The sound controlled device comprises a processor of the sound controlled device, a memory of the sound controlled device, and a microphone of the sound controlled device for receiving a sound command conforming to a sound command protocol to be received at the microphone of the sound controlled device. The system also includes a sound interface device communicatively coupled to the sound controlled device. The sound interface device includes a processor of the sound interface device, a memory of the sound interface device, and a speaker of the sound interface device to generate the sound command conforming to the sound command protocol for receipt at the microphone of the sound controlled device. In addition, the sound interface devices has an audio input interface, and a soundwave damper to reduce a sound receiving capability of the microphone of the sound controlled device from a user within an ordinary sound receiving environment of the sound controlled device by disrupting a soundwave communication medium. The system may further include a network, a server comprising the sound recognition engine and an assistance service engine, and a mobile device.

BRIEF DESCRIPTION OF THE DRAWINGS

The embodiments of this disclosure are illustrated by way of example and not limitation in the figures of the accompanying drawings, in which like references indicate similar elements and in which:

FIG. 18 is a voice controlled device routing and backup re-routing process flow illustrating a process by which the sound interface device may determine a first voice controlled device which to route a voice command to, receive a failure response after routing the voice command, and re-route the voice command and/or a different voice command to a second voice controlled device to permit two or more voice controlled devices to simulations operate within a shared sound communication environment, according to one or more embodiments.

FIG. 19 is an assistance action profile process flow illustrating generation of the assistance action profile of FIG. 5 usable to automate upon occurrence of an initiation condition one or more assistance actions of one or more assistance applications accessible through the voice controlled assistance device of FIG. 4 and/or assistance through the assistance service engine, according to one or more embodiments.

FIG. 20 is an automated assistance action initiation process flow illustrating a process by which a specific instance of the assistance action profile of FIG. 19 may be defined and triggered upon occurrence of the initiation condition, according to one or more embodiments.

Other features of the present embodiments will be apparent from the accompanying drawings and from the detailed description that follows.

DETAILED DESCRIPTION

Disclosed are a method, a device, a system and/or a manufacture of enhanced control and security of a voice controlled device. Although the present embodiments have been described with reference to specific example embodiments, it will be evident that various modifications and changes may be made to these embodiments without departing from the broader spirit and scope of the various embodiments.

Figure 1:
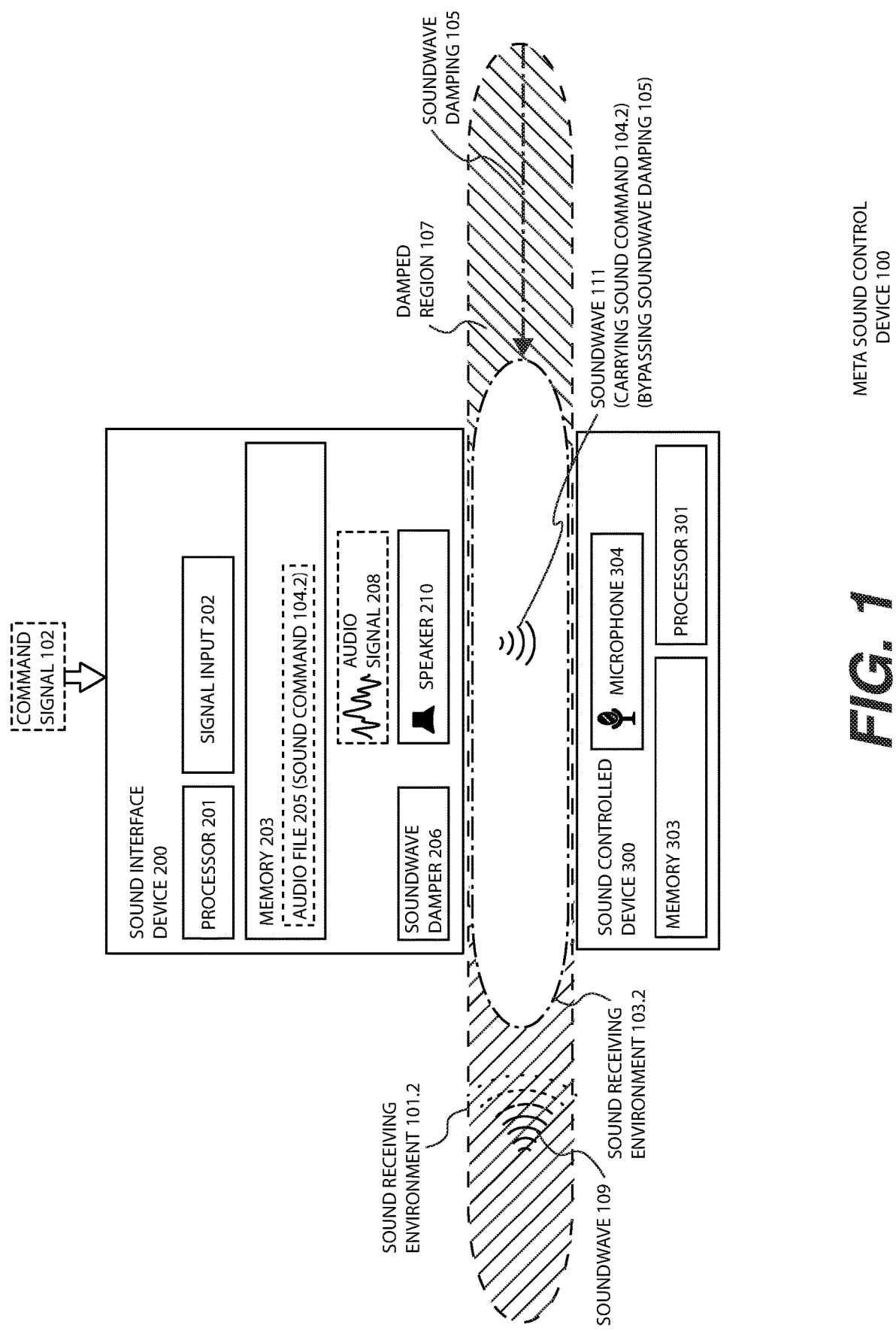
FIG. 1 illustrates a meta sound interface device that includes both a sound controlled device that may operate independently and a sound interface device communicatively coupled to the sound controlled device through sound but damping and/or exceeding a sound receiving capability of the sound controlled device, the sound interface device receiving a command signal, determining the command signal is associated with an audio file that encodes a sound command usable to initiate an action in the sound controlled device, and communicating a soundwave carrying the encoded sound command to a microphone of the sound controlled device to initiate the action, according to one or more embodiments.

FIG. 1 illustrates a meta sound interface device 100 that includes both a sound controlled device 300 that may operate independently and a sound interface device 200 communicatively coupled to the sound controlled device 300, according to one or more embodiments. The sound controlled device 300 is a device that may execute an action in response to a sound command 104.2 received as a soundwave (e.g., the soundwave 109, the soundwave 111) from a soundwave communication medium such as air. The action may be to control another device, machine, apparatus or system, for example to turn on a switch. In one or more embodiments, such as shown and described in conjunction with FIG. 4, the sound controlled device 300 is a voice controlled device that may take the action and/or generate a speech response based upon a voice command 106.2 of a user 120 generated within a sound receiving environment 101.2 (e.g., one room, two rooms, 50 feet radius from the device). In yet one or more other embodiments, the sound controlled device 300 is specifically a voice controlled assistance device shown in FIG. 4 (e.g., an Amazon Echo, a Google Home) accessing an "artificial intelligence" personal assistant that is a computer software. The action may be to retrieve information and return the information to the user in the form of a speech response.

Figure 3:
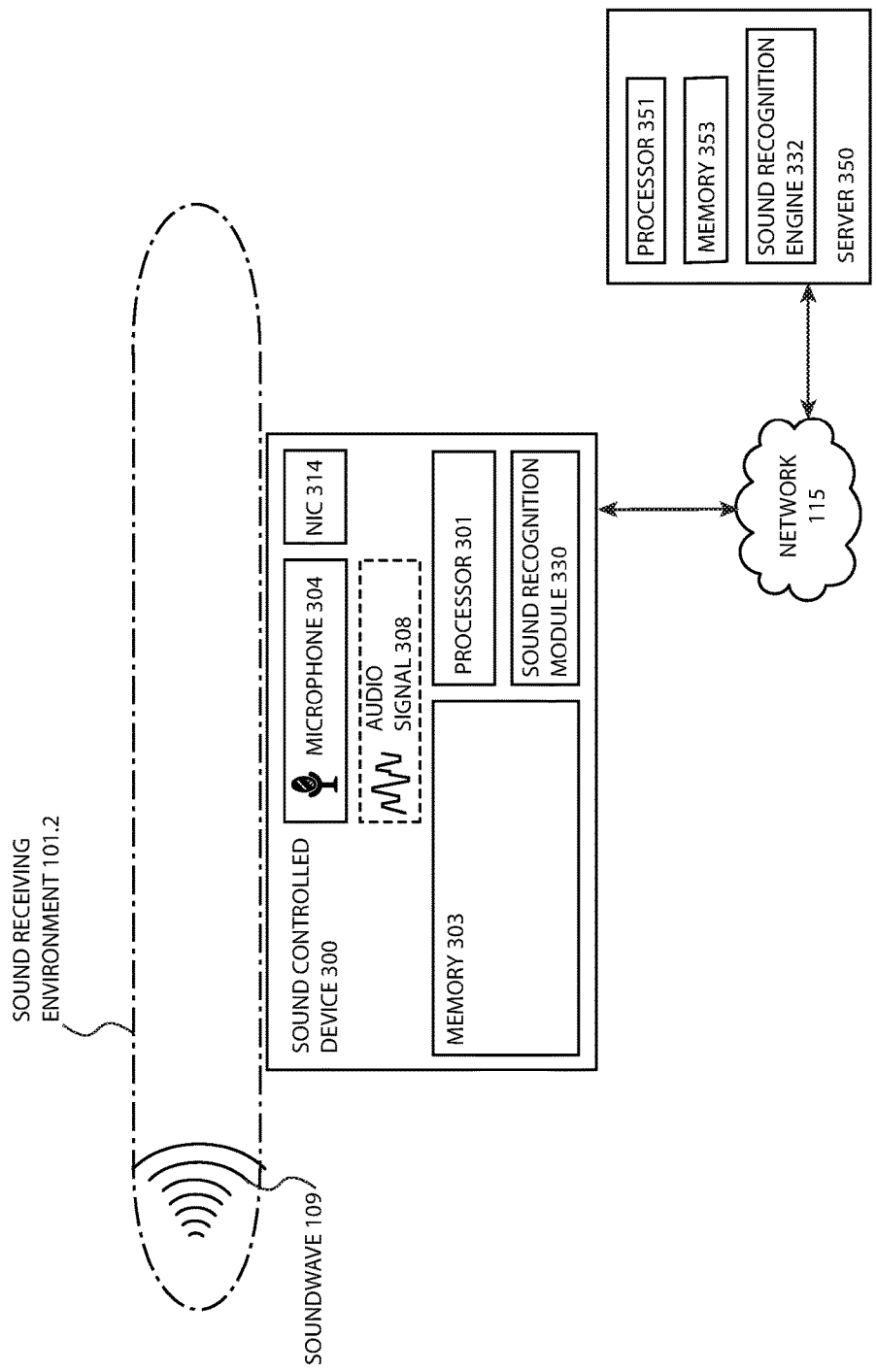
FIG. 3 illustrates the sound controlled device of FIG. 1 uncoupled from the sound interface device in a native state of operation, including a microphone for receiving a soundwave (e.g., the soundwave carrying a command of the sound controlled device) within a sound receiving environment of the sound controlled device, the sound controlled device including a sound recognition module and/or accessing a sound recognition engine on a server through a network to determine the sound command and return a sound response, according to one or more embodiments.

The sound controlled device 300 is further shown and described in conjunction with the embodiment of FIG. 3. The sound controlled device 300 receives the sound command with a microphone 304. The sound interface device 200 may be placed proximate to and/or physically coupled to the sound controlled device 300 such that a speaker 210 of the sound interface device 200 can communicate to the microphone 304 of the sound controlled device 300. The sound interface device 200 may then utilize a soundwave damper 206 to reduce a sound receiving environment 101.2 and/or utilize an enhanced sound receiving capability relative to the sound controlled device 300. Collectively, the sound interface device 200 and the sound controlled device 300 may establish what may be referred to as the meta sound interface device 100. In the present embodiments, an element number including ".1" (e.g., the sound command 104.1, the sound receiving environment 101.1) indicates a command initiating an action in and/or a response from the sound interface device 200, whereas an element number including ".2" (e.g., the sound command 104.2, the sound receiving environment 101.2) indicates a command initiating an action in and/or a response from the sound controlled device 300.

The sound interface device 200 receives a command signal 102 at a signal input 202. The signal input 202 in one or more embodiments is a microphone 204 and the command signal 102 may be a sound command 104.1 of the sound interface device 200. The command signal 102 triggers computer readable instructions executable on a processor 201 to determine an appropriate instance of an audio file 205 associated with the command signal 102, the audio file 205 encoding a sound command 104.2 usable to initiate an action of the sound controlled device 300. The audio file 205 is used to generate an audio signal 108 that is communicated to a speaker 210 that in turn generates a soundwave 111 carrying the sound command 104.2. The soundwave 111 bypasses and/or penetrates the damped region 107 to be communicated to the microphone 304 of the sound controlled device 300. In one or more embodiments, the soundwave 111 may be a one-way communication (e.g., a unidirectional communication) between the sound interface device 200 and the sound controlled device 300. A processor 301 of the sound controlled device 300 and a memory 303 of the sound controlled device 300 may then parse the sound command 104.2, for example to determine which responsive action should be taken and/or to transmit the sound command 104.2 and/or additional data through a network 115 for further analysis. As a result, from a perspective of a user 120, the responsive action occurs as a primary result of the command signal 102 rather than the sound command 104.2. The sound command 104.2 may be quiet from the perspective of the user 120 due to the close proximity of the speaker 210 and the microphone 304. In one or more preferred embodiments the user 120 does not hear the sound command 104.2.

The sound receiving environment 101 of a specific device (e.g., the meta sound interface device 100, the sound interface device 200, the sound controlled device 300) is a distance with which the device can detect a soundwave over a threshold trigger level and recognize a command within a soundwave within an intended range of decibels for operation. For example, the sound receiving environment 101 of the sound controlled device 300 may be a small to medium size room and/or about a 50 foot radius for the device. The sound damping increases the decibel level required at a soundwave point of origin for receipt at the microphone and/or recognition by the sound controlled device 300. For example, where nearby conversational speech within one meter may be about 60 decibels, the soundwave damping may cause a speaker at the same distance to speak at louder (e.g., 80 decibels) or move even closer (e.g., almost immediately next to the microphone).

Figure 2:
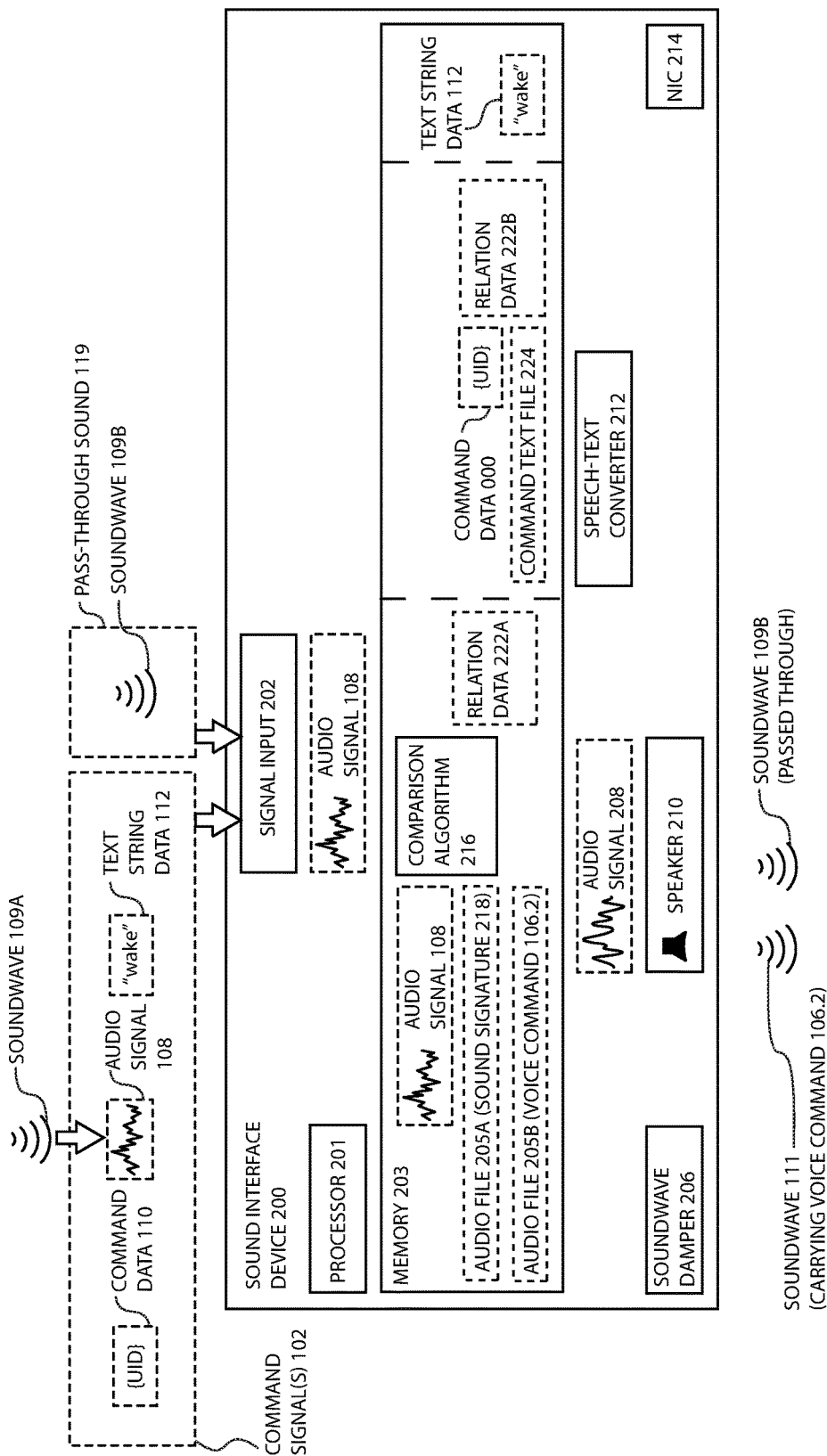
FIG. 2 illustrates the sound interface device of FIG. 1, including instances of the command signal such as a sound command received by a microphone of the sound interface device (e.g., a voice command of the sound interface device) enabling the sound interface device to override a sound communication protocol of the sound controlled device to control the sound controlled device with the command signal rather than the sound command of the sound controlled device, according to one or more embodiments.

FIG. 2 illustrates the sound interface device 200 of FIG. 1, including instances of the command signal 102, according to one or more embodiments. The embodiment of FIG. 2 demonstrates several instances of the command signal 102, each which may have its own type of the signal input 202 and/or process for generating the sound command 104.2 to initiate an action in and/or a response from the sound controlled device 300. Each component shown within the sound interface device 200 is connected to each other component of the sound interface device 200, for example through a data bus, wiring, or other data communication systems and methods.

In one or more preferred embodiments, the command signal 102 may be a soundwave 109 that carriers a sound command 104.1. The sound command 104.1 may further be a voice command 106.1. In this instance, the signal input 202 may be the microphone 204. The microphone 204 converts the sound command 104.1 into an audio signal 108. The audio signal 108 may be a digital or analog signal after conversion, but may be shortly thereafter converted to a digital form where they may be loaded into the memory 203. The comparison algorithm 216, which includes computer executable instructions in the memory 203, then compares the audio signal 108 to a sound signature 218 stored as an audio file 205A. Where the comparison algorithm 216 determines a threshold similarly match, the audio signal 108 is recognized and/or validated. A relation data 222A is then referenced to determine an association between the sound signature 218 and an audio file 205B encoding the sound command 104.2 usable to initiate an action and/or a response in the sound controlled device 300. The audio file 205B is converted into an audio signal 208 and utilized by the speaker 210 to generate the soundwave 111 carrying the sound command 104.2 to the microphone 304 of the sound controlled device 300. The comparison algorithm 216, for example, may be implemented with an extensive lexicon model or hidden Markov model for speech recognition as may be known in the art.

The sound interface device 200 may also directly receive an electronic signal of the audio signal 108, either in analog or digital form, as the command signal 102. In such case the signal input 202 may be a port to receive the signal, for example, an audio auxiliary jack, an audio-visual (A/V) port and/or a high definition multimedia interface (HDMI) port. The audio signal 108 received electronically may then be compared to the sound signature 218 by the comparison algorithm 216, similar to the instance of sound signal 108 converted from the soundwave 109. In one or more additional embodiments, the microphone 204 may be plugged into the signal input 202 accepting the electronic instance of the audio signal 108, the microphone 204, for example, able to gather the soundwave 109 from another location. A specific example of an audio port is shown and described in conjunction with FIG. 11.

In a third instance, the command signal 102 may be a command data 110 to instruct the sound interface device 200 to communicate the sound command 104.2 to the sound controlled device 300. For example, the sound interface device 200 may include a database of known commands initiating an action in the sound controlled device 300, each known command associated with a unique identifier (UID). In such case the signal input 202 may be a digital communications port and/or a network interface controller (e.g., the NIC 214) such as USB, Ethernet, USB-C, a wireless transmitter/receiver such as WiFi, LTE, and other digital communications methods. The NIC 214 may also be implemented a wireless communication module that specifically sends data over a wireless communication protocol (e.g., WiFi, LTE). The mobile device 122, for example, may primarily use a wireless communication module. The NIC 314 of FIG. 3 may be similar such components. The database may be a collection of audio files (e.g., multiple instances of the audio file 205, each containing an instance of the sound command 104.2) or a collection of command text files 224 that may be converted into speech using the text-speech converter 212. In the embodiment of FIG. 2, the command data 110 is implemented with a UID associated with the command text file 224 with the relation data 222B. Upon receipt of the command data 110, computer executable instructions determine the relation data 222B and extracts the associated command text file 224 which is converted into the audio signal 208 using the text-speech converter 212. The text-speech converter 212 may be, for example, implemented with a lightweight open source software code such as CMU Flite and/or proprietary software such as Responsive Voice.

The command signal 102 may also receive the text string data 112 as data through the signal input 202. The text string data 112 as received may encode the sound command 104.2 and may be directly converted by the text-speech converter 212 to the audio signal 208 and then the soundwave 111 carrying the sound command 104.2. In one or more embodiments, the text string data 112 carrying multiple instances of the sound commands 104.2 may be useful for implementing the assistance action profile 504 that may automatically invoke an assistance application 440 and initiate an assistance action 442, as shown and described in conjunction with FIG. 4, FIG. 5, FIG. 19 and FIG. 20.

In one or more embodiments, the sound interface device 200 may pass to the microphone 304 of the sound controlled device 300 a soundwave 109 substantially unimpeded from a sound receiving environment 101.1 of the sound interface device 200. For example, where the sound controlled device 300 is the voice controlled assistance device 400 of FIG. 4, the command signal 102 may trigger the sound interface device 200 to speak a "wake word" to the microphone 304 of the voice controlled assistance device 400 (e.g., as the sound command 104.2 initiating a wake action). Following the wake action that may initiate active listening of the voice controlled assistance device 400, the soundwave 109B of FIG. 2 that may for example encode additional speech of a user 120 that may be passed directly from the sound receiving environment 101.1 of the sound interface device 200 to the microphone 304 of the voice controlled assistance device 400 (e.g., as the pass-through sound 119 of FIG. 2). Alternatively or in addition, the soundwave damper 206 may be disabled and/or adjusted to increase the sound receiving environment 101.2 of the sound controlled device 300 to receive the soundwave 109B.

In one or more embodiments, the sound interface device 200 may be capable of receiving one or more types of command signal 102 (e.g., the audio signal 108 and the command data 110), have more than one type of signal input (e.g., a data port and the microphone 204), and/or initiate the sound command 104.2 through more than one process (e.g., translation of the text string data 112 to the sound command 104.2, a UID database lookup).

FIG. 3 illustrates the sound controlled device 300 of FIG. 1 uncoupled from the sound interface device 200 in a native state of operation, according to one or more embodiments. In its native state, a microphone 304 receives a soundwave 109 (e.g., encoding a sound command 104.2 of the sound controlled device 300) within a sound receiving environment 101.2 of the sound controlled device 300. A sound recognition module 330A that includes a set of computer executable instructions for determining an action and/or a response associated with the sound command 104.2. Alternatively or in addition, the sound controlled device 300 may access, using the NIC 314 and through a network 115, a server 350 that may include the sound recognition engine 332. The sound recognition engine 332 may be a more powerful instance of the sound recognition module 330, for example by leveraging parallel cloud computing on multiple instances of the processor 351 and multiple or many instances of the memory 353. For example, the sound recognition module 312 may be able to approximate a sound recognition to determine a particular type of sound (e.g., the sound is a type of speech that should be sent to the server 350 for detailed analysis), recognize a limited set of voice commands with a high degree of accuracy such as a wake word, and/or implement a sound password, access control and/or voice authentication. The network 115 may be a local area network (LAN), a wide area network, the internet, a virtual private network, a satellite network and/or a cellular tower network (e.g., utilizing 4G or LTE communication protocols), or any combination. Each component shown within the sound controlled device 300 is connected to each other component of the sound controlled device 300, for example through a data bus, wiring, or other data communication systems and methods.

In response to the sound command 104.2, the sound controlled device 300 may undertake a number of different actions and/or responses. The sound controlled device 300 may initiate actions in and control a physical machine, a medical tool, an autonomous vehicle, an industrial controller, or other piece of equipment. Initiated actions may include a start action, a stop action, an emergency shut down action, a maintain action, and numerous other control actions. For example, where a certain grinding noise is detected indicating a collision of equipment, an industrial controller may halt a manufacturing process. The sound controlled device 300 may control an electrical switch (e.g., The Clapper® that may turn off power to a device when a sharp sound such as a clap of the user's hands is received within a sound receiving environment). In one or more embodiments, the sound controlled device 300 is the voice controlled device that can control, for example, a sophisticated household connected appliance such as a cloths washing machine (e.g., initiated by a voice command 106.2 such as "Start, light load, medium agitation, 40 minutes."). One or more responsive actions to the sound command 104.2 may be a sound response 311. For example, the sound response 311 may be a chime indicating that the voice-controlled cloths washing machine has understood the command of the user 120 and initiated the wash cycle. However, in one or more preferred embodiments, the sound controlled device 300 is the voice controlled assistance device 400 of FIG. 4. which may have even greater speech recognition and/or conversational response capabilities.

Figure 4:
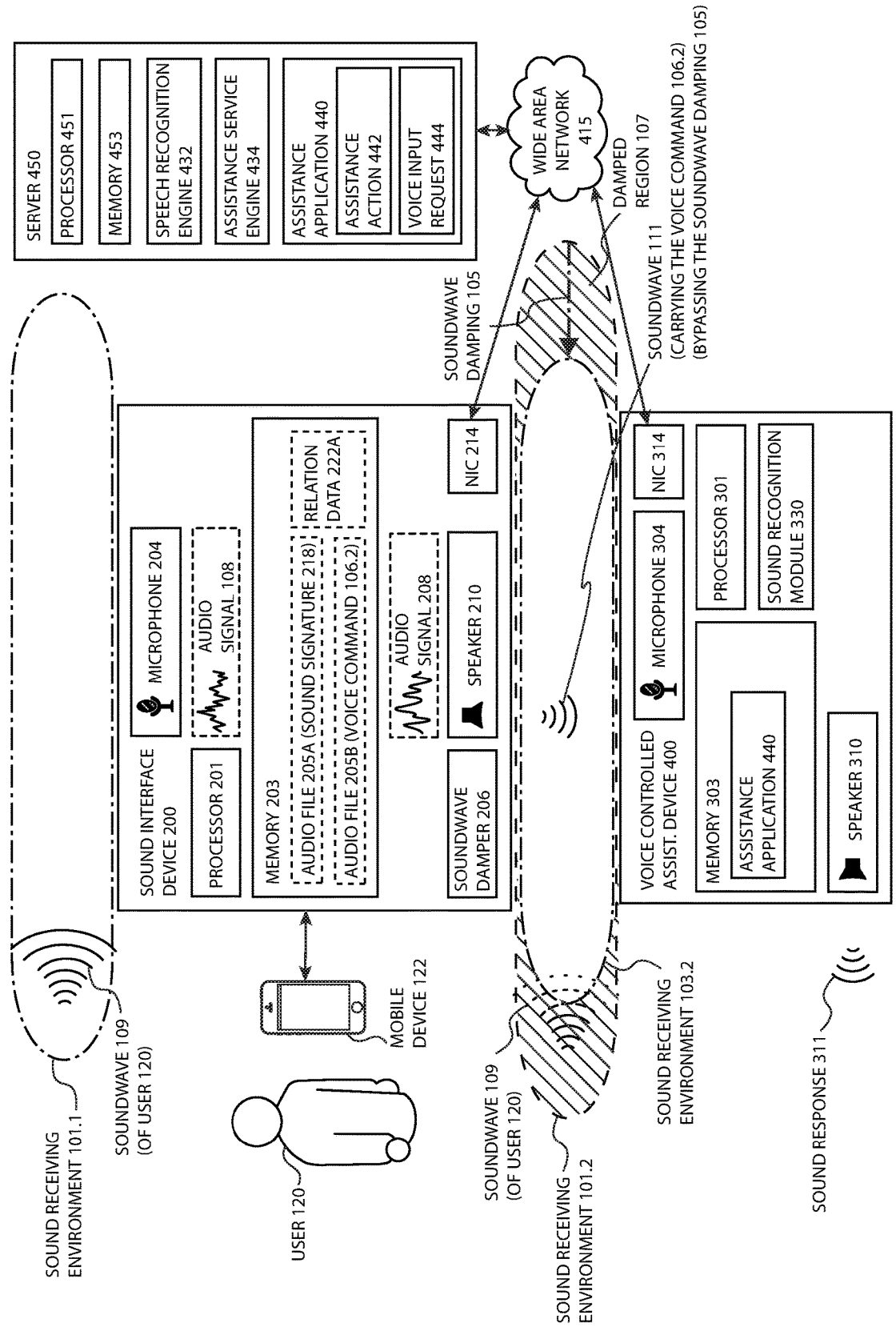
FIG. 4 illustrates a specific instance of the sound controlled device of FIG. 3 that is a voice controlled device, and specifically a voice controlled assistance device accessing through a wide area network an assistance service engine providing an artificial intelligence assistant and/or one or more assistance applications to a user communicating with the voice controlled device through speech, the sound interface device of FIG. 2 damping and/or exceeding a sound receiving capability of the voice controlled device and permitting the user to set a custom command to be received at the sound interface device that then may trigger a voice command to bypass a soundwave damping field, the voice command received at the voice controlled device to initiate from the assistance service engine a speech response for the user, according to one or more embodiments.

FIG. 4 illustrates one or more preferred embodiments in which the sound controlled device 300 is a voice controlled assistance device 400 and the sound interface device 200 receives as its command signal 102 a voice command 106.1 permitting a user 120 to replace and/or augment a voice command protocol of the voice controlled assistance device 400, according to one or more embodiments.

The assistance service engine 434 may allow the user to search the web using his or her voice, order a product, engaging in a social interaction including with other instances of the user 120, interact with an artificial intelligence assistant, calendar a reminder or event, control household connected devices and/or appliances (e.g., "internet of things" or "IoT" devices usable by the user 120), and similar functions. More examples of an assistance action 442 that the voice controlled assistance service 400 and/or the assistance service engine 434 may take include ordering a food service, ordering a professional service, purchasing a media content, ordering a product, paying a bill, reading a message, sending a message, accessing a file, controlling a connected device, and controlling a household appliance. The speech recognition engine 432 recognize and/or translates a speech of the user 120 and an assistance service engine 434 that is a computer program that provides a general assistance to the user, carrying out actions at the request of the user 120. The assistance service engine 434 may also be used to generate speech responses (e.g., the sound response 113 that is the speech response) for the user 120. The speech recognition engine 432 may be software capable of identifying and/or responding to the sounds produced in human speech and/or capable of receiving and interpreting dictation. The speech recognition engine 432 may forward results of analysis to the assistance service engine 434 to produce an appropriate response. In one or more embodiments, the assistance service engine 434 may provide an artificial intelligence assistant (e.g., Siri, Alexa, Cortana, Google Assistant, Bixby) and/or a robotic personality for interaction with the user 120. For example, the assistance service engine 434 may feature a natural language user interface to answer questions, make recommendations, and perform actions by delegating requests to a set of web services. The assistance service engine 434 may adapt to the user 120's individual language usage and individual searches (preferences) with continuing use, and may returns results that are individualized. In one or more embodiments, the assistance service engine 434 may be capable of voice interaction, music playback, making to-do lists, setting alarms, streaming podcasts, playing audiobooks, and/or providing weather, traffic, and other real time information, such as news. The assistance service engine 434 may also be able to control several smart devices as a home automation system. In one or more embodiments not shown in the accompanying figures, the sound interface device 200 may include a software component, an agent, and/or a client-side application of the sound interface device 200 for efficient communication and interfacing with the voice controlled assistance device 400.

In addition, the voice controlled assistance device 400, in one or more embodiments may include one or more instances of an assistance application 440 that is computer software that can perform specific instances of the assistance action 442 in response to a voice command of the user 120 (e.g., the initiation command 542) conforming to a voice command protocol of the assistance application 440. In one or more embodiments, the assistance application 440 may be referred to as a "skill" of the automated assistance service (e.g., an Amazon Alexa Skill) that the user 120 may install and/or enable for use with the automated assistance service. The assistance application 440 may be integrated with the assistance service engine 434, called by assistance service engine 434, or stored locally on the voice controlled assistance device 400.

For example, the assistance application 440 may be a voice controlled history application that may be able to teach the user 120 about historical events. The history application may have an invocation command 540, for example "launch history app." The voice command protocol may be one or more commands that the history app recognizes and will response to. In this case, for example, the voice command protocol may include the commands: "Tell me about a historical event that happened in September", or "Hear more about this event", or "test me on my World War One knowledge". Each command acts as an initiation command 542 conforming to the voice command protocol. The assistance application 440 may additionally require one or more voice inputs 444 which the user 120 may provide in the form of voice instructions 544. For example, if the user 120 asks to learn about "a famous battle", the assistance application 440 may request a voice input 444 by asking "in which year would you like to hear about a famous battle?" Similarly, for an assistance application 440 for ordering a food service, an initiation command 542 may always request voice input 444 that include the menu items to be ordered and/or a street address for delivery. Streamlined interactions involving the assistance application 440 between the sound interface device 200, the server 450 for providing the assistance service engine 434, and a server 500 for storing and/or scheduling execution of the assistance action profile 504 are further shown and described in conjunction with FIG. 5, FIG. 19, and FIG. 20.

In the embodiment of FIG. 4, a sound receiving capability of the voice controlled assistance device 400 is reduced by the soundwave damping 105 produced by the soundwave damper 206 of the sound interface device 200. The sound interface device 200 controls the voice controlled assistance device 400 based on sound commands 104.1 and/or a voice command 106.1 received on the microphone 204 of the sound interface device 200. The sound interface device 200 may receive a soundwave 109 from a sound receiving environment 101.1. The voice controlled assistance device 400 may ordinarily have a sound receiving environment 101.2 (e.g., when undamped). However, the soundwave damping 105 may reduce the soundwave receiving capability of the voice controlled assistance device 400 to the sound receiving environment 103.2. In one or more embodiments, the sound receiving environment 103.2 only includes an area just surrounding the microphone 304. Although the user 120 is drawn outside of the sound receiving environment 101.1 and the sound receiving environment 101.2 in the embodiment of FIG. 4 for clarity, the user 120 in the embodiment of FIG. 4 is inside of and generates the soundwave 109 within the sound receiving environment 101.1 and the sound receiving environment 101.2.

The sound interface device 200 includes an audio file 205B encoding a voice command 106.2 of the voice controlled assistance device 400, and includes an audio file 205A that encodes a sound signature 218 (that acts as the voice command 106.1 initiating an action of triggering the voice command 106.2 through the computer executable instruction of the sound interface device 200). For example, the sound signature 218 could be a custom voice command of the user 120. The user 120 may set the sound signature 218 using the mobile device 122 that may be communicatively coupled to the sound interface device 200, including coupling through the network 115 and/or the wide area network 415. For example, the user 120 may record the audio file 205A on the mobile device 122 as an intended sound signature 218, connect to the sound interface device 200 through a Bluetooth connection or a WiFi router connection, and transfer the audio file 205A to the sound interface device 200 through a mobile application designed to interface with the sound interface device 200. The user 120 may additionally then select a voice command 106.2 to be communicated to the voice controlled assistance device 400 and/or record the voice command 106.2 as the audio file 205B. The voice command 106.2 may be selected in the mobile application or on a graphical user interface of a display of the sound interface device 200. The association of the audio file 205A and 205B (e.g., the association between the sound signature 218 and the voice command 106.2) is stored in the memory 203 as the relation data 222A) that may be a data relation reference, and/or a pointer to a memory address and/or memory location of the memory 203.

The user 120 or a different source may generate the soundwave 109 within the sound receiving environment 101.1. The sound receiving environment 101.1 may be similar in size to the sound receiving environment 101.2 that may be the ordinary sound receiving capability of voice controlled assistance device 400. However, in the embodiment of FIG. 4, the sound receiving environment 101.2 may be attenuated by the soundwave damper 206 to create the sound receiving environment 103.2 that is reduced relative to the sound receiving environment 101.2. The soundwave 109 in FIG. 4 is generated from the same point a distance away from the sound interface device 200. The soundwave 109 is received by the microphone 204 and may be detected by the sound interface device 200 as above a threshold sound detection level of the sound interface device 200; the soundwave 109 the embodiment of FIG. 4 is not received by the microphone 304 and/or is not detected by the voice controlled assistance device 400 as above a threshold sound detection level of the voice controlled assistance device 400.

The microphone 204 and possibly additional electronic components generates the audio signal 108, which is compared in the processor 201 to the audio file 205A that encodes the sound signature 218 (e.g., utilizing the comparison algorithm 216 of FIG. 2). Upon a threshold similarity match, the processor 201 executes instructions that follow the relation data 222A to the memory address of the audio file 205B that encodes the voice command 106.2. The audio file 205B is converted into the audio signal 208 which is used by the speaker 210 to generate the soundwave 111. The soundwave 111 travels through the sound receiving environment 103.2, bypassing and/or unaffected by the soundwave damping 105, to be received at the microphone 304 and to initiate an action in and/or a response from the voice controlled assistance device 400.

The embodiment of FIG. 4 may be used to replace and/or supplement one voice command protocol with another. It may also be used to replace a voice command protocol with a sound command protocol utilizing sounds other than voice. In a specific example, sound signature 218 could be a sound of a door chime within a retail store that sounds when a customer enters the retail store. The voice command 106.2 may be a "Siri, give me a complement." If the voice controlled device accessing the Siri personal assistance is placed close to the door of the retail shop, a customer entering the door will sound the door chime and trigger a compliment from the Siri personal assistant. The customer will not have heard the voice command 106.2. Conversely, although not shown in the embodiment of FIG. 4, the sound interface device 200 may be utilized to control with a voice command 106.1 an instance of the sound controlled device 300 that is not controlled by voice commands and/or does not take action in response to a voice command protocol. In the example of an industrial controller with an instance of the sound controlled device 300 that may halt the industrial controller upon detecting what may be a collision noise, the sound interface device 200 may be used to cause a voice command 106.1 of "emergency stop" to halt the industrial controller. The sound command 104.2 could be a recorded or simulated collision noise.

In the embodiment of FIG. 4, the voice controlled assistance device 400 interprets the sound command 106.2 locally or communicates the voice command 106.2 through the wide area network (e.g., the internet) to the server 450 for voice analysis and/or to determine an action and/or a response associated with the voice command 106.2. A speech recognition engine 432 may interpret the voice command 106.2 (e.g., analyze the audio signal 308 of FIG.

3 encoding the voice command 106.2) and the assistance service engine 434 may then generate a response. In the embodiment of FIG. 4, the response is a sound response 311 that the user 120 may perceive, for example music (e.g., where the voice command 106.2 commanded a particular song to play from a music streaming service), a speech response (e.g., where the voice command 106.2 requested information such as an event time), or another sound. Each component shown within the voice controlled assistance device 400 is connected to each other component of the voice controlled assistance device 400, for example through a data bus, wiring, or other data communication systems and methods, and each component of the server 450 is connected to each other component within the server 450.

Figure 5:
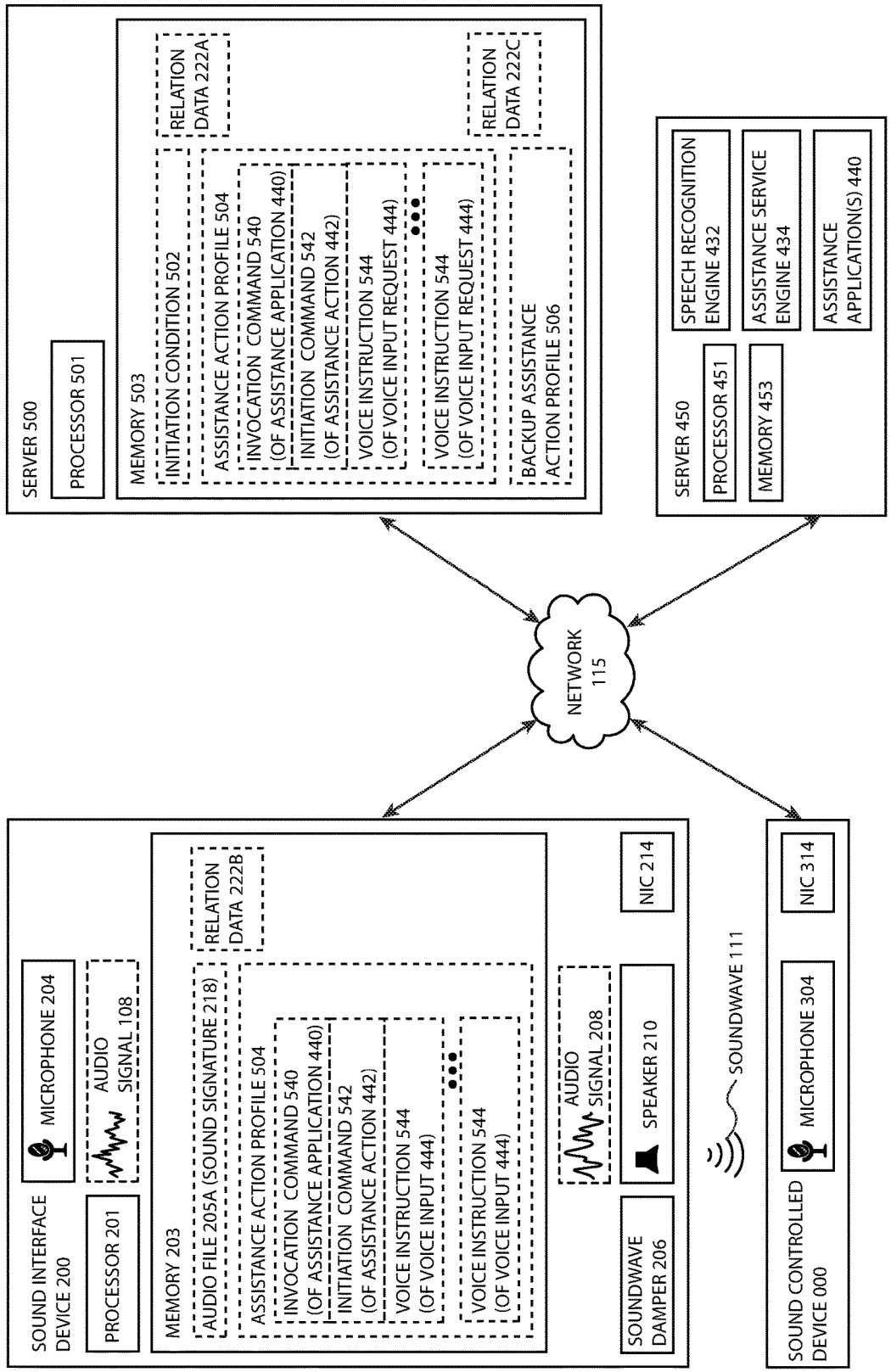
FIG. 5 further illustrates the sound interface device and the voice controlled device of FIG. 4 and further showing an initiation condition and an assistance action profile in a memory of the sound interface device and/or a memory of a server, the assistance action profile including data comprising an invocation command of the assistance application, an initiation command of an assistance action conforming to a voice command protocol of the assistance application, and one or more voice instructions required for execution of the assistance application, the data converted to an audio signal and communicated to the voice controlled device to initiate the assistance action upon occurrence of the initiation condition, according to one or more embodiments.

FIG. 5 further illustrates the sound interface device 200, the voice controlled assistance device 400 of FIG. 4, and additionally illustrates a server 500 storing in a memory 503 an initiation condition 502 associated with an assistance action profile 504, commands of the assistance action profile 504 to be communicated to the sound interface device 200 to automatically initiate one or more assistance actions 442 of an assistance application 440 upon occurrence of the initiation condition 502, according to one or more embodiments. In FIG. 5 the sound interface device 200 is communicatively coupled to the server 500 through the network 115. The server 500 stores the initiation condition 502 related to the assistance action profile 504 by the relation data 222A. The initiation condition 502 may be, for example, occurrence of a predetermined time (e.g., each day at 8 AM), occurrence of a random time (e.g., once per week, or a 5% chance every 20 minutes), upon an instruction and/or a command of the user 120 (e.g., a custom command), or upon receipt of any other data from an application programming interface (API) internal or external to the server 500. The assistance action profile 504 includes one or more commands within a sound command protocol that initiates an action in an assistance application 440. The assistance action profile 504 may include an invocation command 540 that invokes an assistance application 440, an initiation command 542 that initiates an assistance action 442 of the assistance application 440, and one or more voice instructions 544 responsive to one or more instances of a voice input 444. Delays and/or additional data utilized for proper timing of communication of each command and instruction may be included within the assistance action profile 504 to conform to the voice command protocol of the assistance application 440 (e.g., the break 1901 of FIG. 19). Data within the assistance action profile 504 may be stored as a text file and/or as one or more audio files. A process flow for generating the assistance action profile 504 is shown and described in conjunction with the process flow of FIG. 19. Each component of the server 500 is connected to each other component of the server 500.

The server 500 utilizes computer executable instructions to determine occurrence of the initiation condition 502. Upon occurrence of the initiation condition 502, the server 500 follows relation data 222A to determine that assistance action profile 504 should be executed. The data of the assistance application 440, including but not limited to the invocation command 540, the initiation command 542, and the one or more voice instructions 544 are communicated over the network 115 to the sound interface device 200. The assistance action profile 504 may be streamed as one instance of the audio file 205, transmitted as multiple instances of the audio files 205 that are arranged and/or assembled by the sound interface device 200 (e.g., to create an audio file 205, or may be sent as a text file (e.g., as the text string data 112). The sound interface device 200 may serially communicate the data of the assistance action profile 504 to the sound controlled device 300. The server 500 may store many instances of the assistance action profile 504 and, in one or more embodiments act as a repository and/or library of predetermined routines for assistance applications 440.

In one or more embodiments, the sound interface device 200 may also store one or more instances of the assistance action profile 504 in the memory 203; in such case the stored assistance action profile 504 acts as an instance of a voice command 106.2 where stored as an audio file 205 and/or stored as a text string data 112. Each assistance action profile 504 stored locally on the sound interface device 200 may be associated with a sound signature 218 such that the assistance action profile 504 and its contents are triggered when a corresponding sound command 104.1 is received within the sound receiving environment 101.1 of the sound interface device 200.

The sound interface device 200 may pause between the invocation command 540, the initiation command 542, and/or the each of one or more instances of the voice instruction 544. The pauses may be pre-defined (e.g., a moment of silence within the audio file 205). However, in one or more embodiments the memory 201 may include computer executable instructions that cause the microphone 204 to receive any sound response 311 and wait to execute the next command within the assistance action profile 504 until the sound response 311 ceases (e.g., a next instance of the voice input 444 may be requested and/or required and/or one assistance application 440 has terminated and other may now be initiated).

Additional data not shown in the embodiment of FIG. 5 may also be included in the assistance action profile 504. For example, the assistance action profile 504 may have associated data that caused the sound interface device 200 and/or the sound controlled device 300 to announce on a speaker the assistance action 442 to be initiated by the assistance application 440 and/or request a confirmation from a user 120 (e.g., a verbal confirmation) to execute any of the commands contained in the assistance action profile 504 including the invocation command 540 and/or the initiation command 542. The sound interface device 200 may include an additional speaker (e.g., a speaker 210B) for communicating the confirmation request and/or the announcement to the user 120. The confirmation request and/or announcement may, for example, be added any location of the break 1901 of FIG. 19.

The server 500 and/or the sound interface device 200 may further include a backup assistance action profile 506 that may be related to the assistance action profile 504. The sound interface device 200 may store one or more instances of the sound signature 218 that may match error messages within the sound command protocol of the sound controlled device 300. For example, Siri may say "I didn't understand that" or "I don't have an action matching that command." Upon determination of an error message or another event indicating an error, the sound interface device 200 may communicate with the server 500 to call for the backup assistance action profile 506 which may be returned and executed in a similar fashion to the assistance action profile 504.

Figure 6:
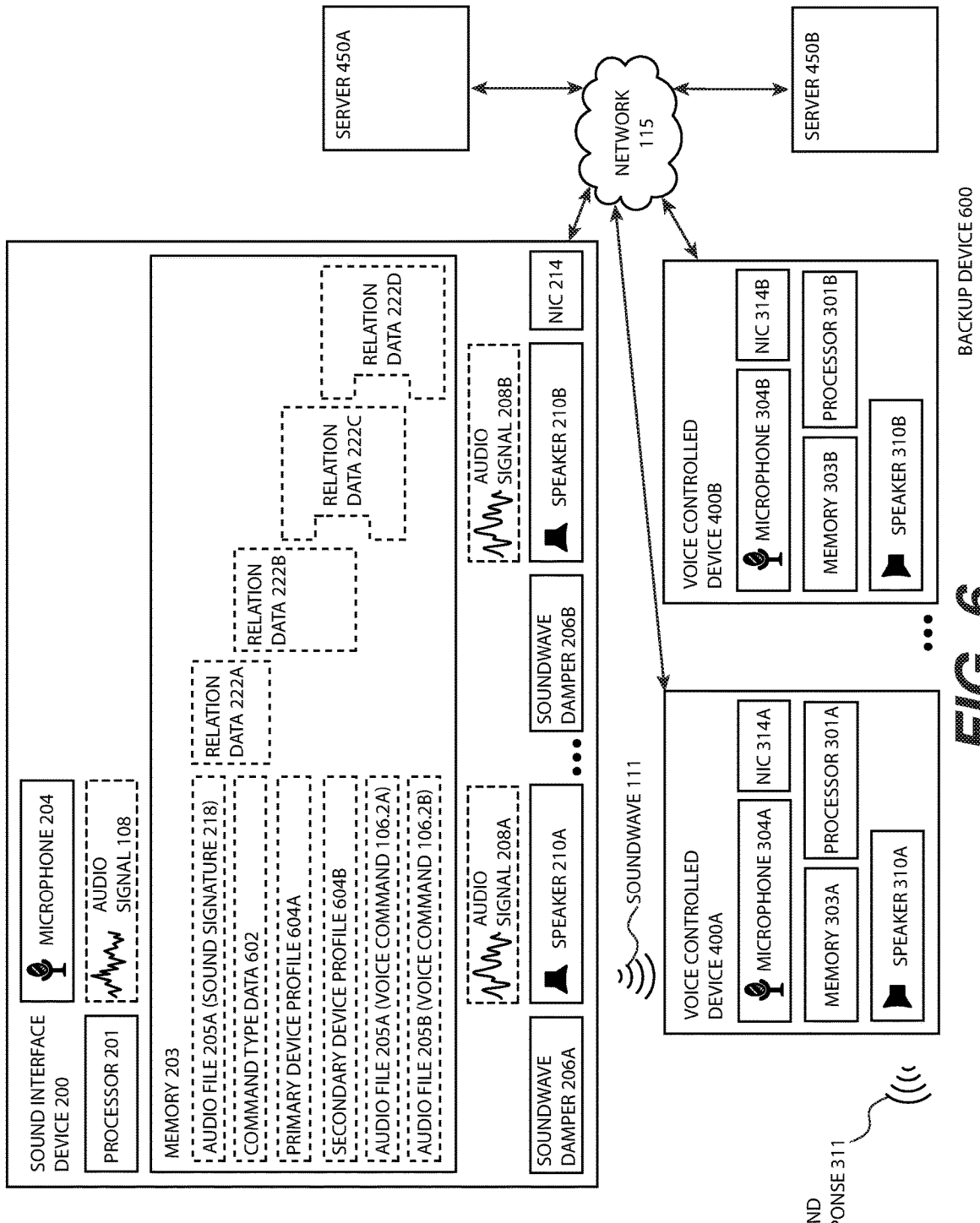
FIG. 6 illustrates the sound interface device of FIG. 2 damping two instances of the voice controlled assistance device of FIG. 4, a first voice controlled assistance device communicatively coupled to a first server providing a first assistance service engine and a second voice controlled assistance device communicatively coupled to a second server providing a second assistance service engine, the sound interface device determining to which voice controlled assistance device to route a voice command and therefore which instance of the assistance service engine to invoke, according to one or more embodiments.

FIG. 6 illustrates the sound interface device 200 of FIG. 2 damping two instances of the voice controlled assistance device 400 of FIG. 4, a first voice controlled assistance device 400A communicatively coupled to a first server 450A providing a first assistance service engine 434A (not shown)

and a second voice controlled assistance device 400B communicatively coupled to a second server 450B providing a second assistance service engine 334B (not shown), the sound interface device 200 determining to which voice controlled device 300A to route a voice command 106.2 and therefore which instance of the assistance service engine 334 to invoke, according to one or more embodiments.

In the embodiment of FIG. 6, sound signature 218 is related to a command type data 602 by a relation data 222A. The command type data 602 specifies a type, kind or category of a type of the sound command 104.2 and/or the voice command 106.2. For example, the command type data 602 may specify the category: English language dictionaries. The command type data 602 is associated with one or more device profiles that may be up to a number of instances of the voice controlled assistance device 400 communicatively coupled by the sound controlled device 300 via the relation data 222B. In the embodiment of FIG. 6, the command type data 602 is associated with a primary device profile 604A corresponding to the voice controlled assistance device 400A and a secondary device profile 604B corresponding to the voice controlled assistance device 400B. The primary device profile 604A is further associated with the audio file 205A and the secondary device profile 604B is associated with the audio file 205.

At the time the sound signature 218 is matched, the primary device profile 604A may trigger the audio file 205A to communicate the voice command 106.2A to voice controlled assistance device 400A. In the above example, the voice command 106.2A may be "Get definition of" under a first voice command protocol. Where the voice controlled assistance device 400A returns an error and/or the server 450A is unreachable over the network 115, the secondary device profile 604B may be triggered, converting the audio file 205B into a audio signal 208 encoding the voice command 106.2B for voice controlled assistance device 400B. In the above example, the voice command 106.2B may be "Look up word" because it may be defined by a different voice command protocol. The voice controlled assistance device 400B is therefore a backup device 600 to the voice controlled assistance device 400A. Alternatively, the user 120 may be prompted in real-time to select a device profile (e.g., the primary device profile 604A, the secondary device profile 604B, a tertiary device profile 604C not shown in the embodiment of FIG. 6). However, in one or more other embodiments, an instance of the sound signature 218 may have a relation data 222 directly and optionally exclusively associated with the primary device profile 604A (e.g., such that the voice command 106.1 matching the sound signature 218 will always cause the voice command 106.2 to be relayed to the voice controlled assistance device 400A).

A similar process may be set up for a backup assistance application. For example, the primary device profile 602A may be replaced with a primary assistance action profile 504A and the secondary device profile 602B may be replaced with a secondary assistance action profile 504B. In this case, only one instances of the voice controlled assistance device 400 may be required. Similarly, the primary device profile 602A may be replaced with a primary assistance action profile 504A and the secondary device profile 602B may be replaced with a secondary assistance action profile 504B. For example, where a first food ordering service associated with a first assistance application 440A returns a wait time of greater than one hour upon ordering, an order may be canceled and a second order may be automatically placed with another restaurant associated with a second assistance application 440B.

FIG. 7, FIG. 8, FIG. 9A, FIG. 9B, FIG. 10A, and FIG. 10B illustrate methods, systems, and/or devices by which a sound receiving capability of the sound interface device 200 may exceed a sound receiving capability of the sound controlled device 300. FIG. 7, FIG. 8, FIG. 9A, FIG. 9B, FIG. 10A and FIG. 10B are generally not drawn to scale, nor are proportions between the various embodiments illustrated with proportion to one another. For clarity in the present embodiments, the sound receiving environment 101.1 and the sound receiving environment 101.2 are illustrated separately for the sound interface device 200 and the sound controlled device 300, respectively; however, each sound receiving environment 101 may be coextensive and/or overlapping, with a general area and/or radius of each sound receiving environment 101 general illustrated by its horizontal distance from an edge of the each device. For example, in the embodiment of FIG. 7 the soundwave 109 may be emanating from approximately the same point and/or emanating from the same distance from the microphone 204 and the microphone 304. As shown, the soundwave 109 may be within the sound receiving environment 101.1 of the sound interface device 200 but not within the sound receiving environment 101.2 of the sound controlled device.

Figure 7:
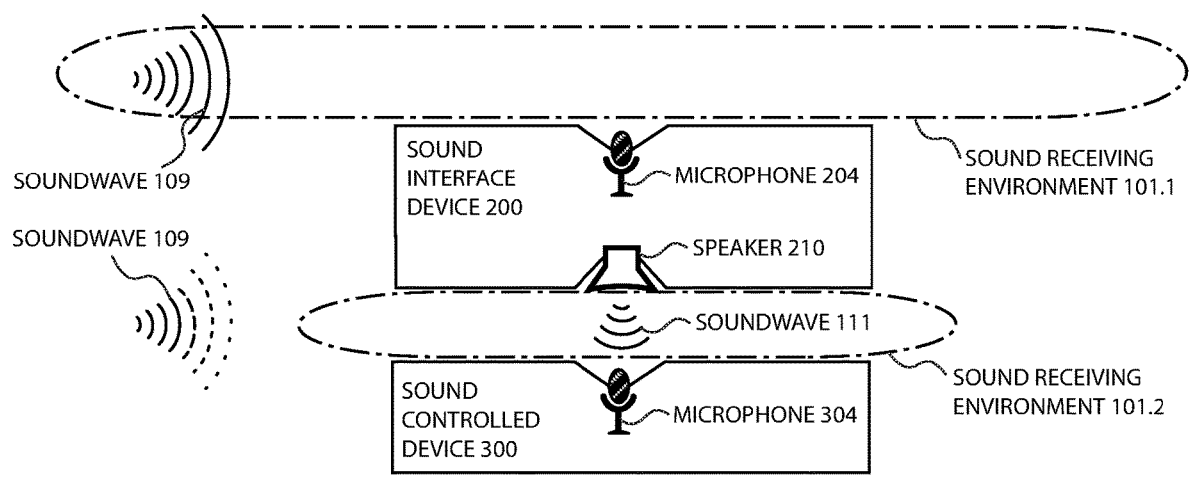
FIG. 7 illustrates one aspect in which the sound interface device of FIG. 2 may command the sound controlled device of FIG. 3, a sound receiving environment of a microphone of the sound interface device and/or a sound recognition capability of the sound interface device shown exceeding a sound receiving environment of a microphone of the sound controlled device and/or a sound recognition capability of the sound controlled device, according to one or more embodiments.

FIG. 7 illustrates one possible configuration in which a sound receiving capability of the sound interface device 200 is relatively superior to a sound receiving capability of the sound controlled device 300 operating in its native condition. For example, the microphone 204 may have a higher sensitivity relative to the microphone 304, the sound interface device 200 may have a lower threshold for sound detection, and/or a sound recognition capability may greater in the sound interface device 200 than in the sound controlled device 300. As just described, the same instance of the soundwave 109 emanating from a point may be within the sound receiving environment 101.1 of the sound interface device 200 and therefore received by the microphone 204 but may be outside of the sound receiving environment 101.2 of the sound controlled device 300 and therefore not received by the microphone 304 and/or not detected or processed by the sound controlled device 300.

Figure 8:
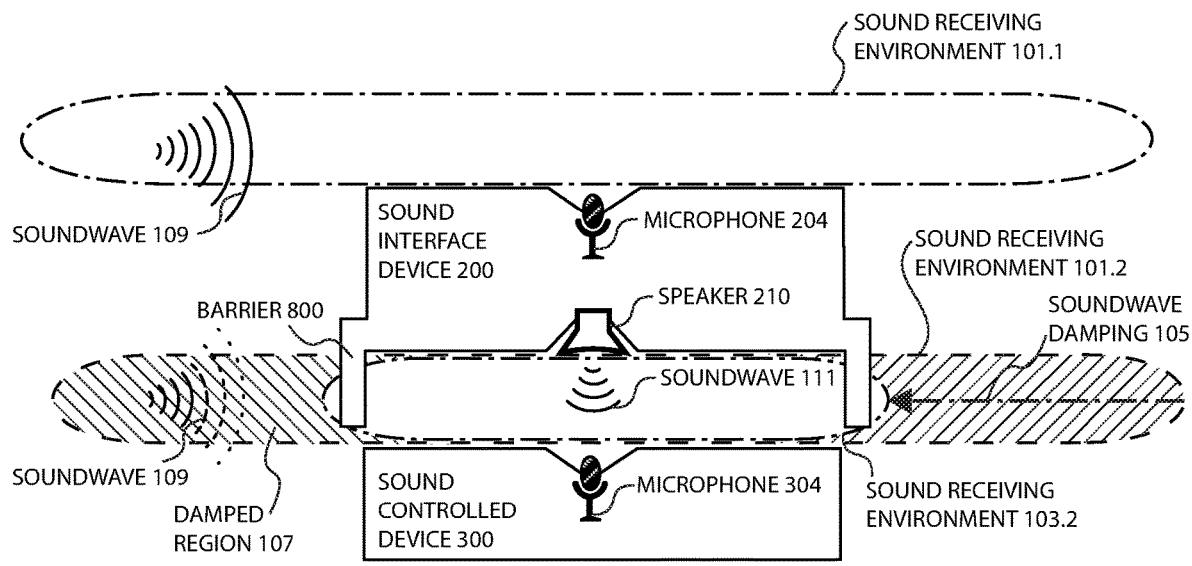
FIG. 8 illustrates one implementation of the soundwave damping of FIG. 1 utilizing a barrier to reduce the sound receiving environment of the sound controlled device of FIG. 3 relative to the sound receiving environment of the sound interface device of FIG. 2, according to one or more embodiments.

FIG. 8 illustrates one implementation of the soundwave damping 105 of FIG. 1 utilizing a barrier 800 to reduce the sound receiving environment 101.2 of the sound controlled device of FIG. 3 relative to the sound receiving environment 101.1 of the sound interface device of FIG. 2, according to one or more embodiments. The barrier 800 may reduce the sound receiving environment 101.1 that may be the ordinary sound receiving environment of the sound controlled device 300 to the sound receiving environment 103.1 that may be a reduced and/or diminished sound receiving environment, such soundwave damping 105 resulting in a damped region 107. The barrier 800 may, be for example, a shield that is made of a hard material (e.g., hard plastic, metal) or a soft material (e.g., rubber, silicone, soft plastic). The barrier 800 may include additional sound-damping features such as foam such that vibration of the barrier 800 when hit by the soundwave 109 are substantially reduced or eliminated. The barrier 800 may or may not include an opening permitting and/or to permit an instance of the soundwave 109 emanating from a point close to the sound controlled device to reach the microphone 304 (e.g., five feet away where the ordinary instance of the sound receiving environment 101.2 would be 50 feet).

Figure 9A:
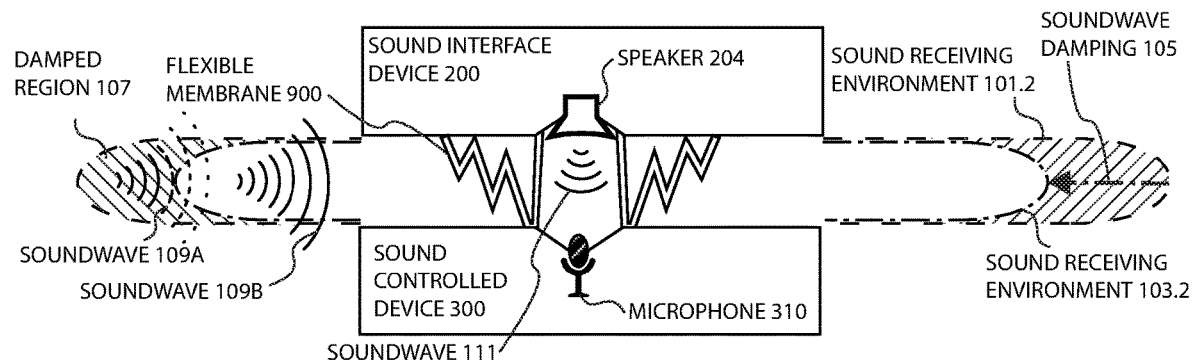
FIG. 9A illustrates another implementation of the soundwave damping utilizing a flexible membrane to reduce the sound receiving environment of the sound controlled device, the particular flexible membrane of FIG. 9A corrugated and protruding at an oblique angle from a surface of the sound interface device to provide an increased degree of damping based on a reduced distance between the surface of the sound interface device and a surface of the sound controlled device, according to one or more embodiments.
Figure 9B:
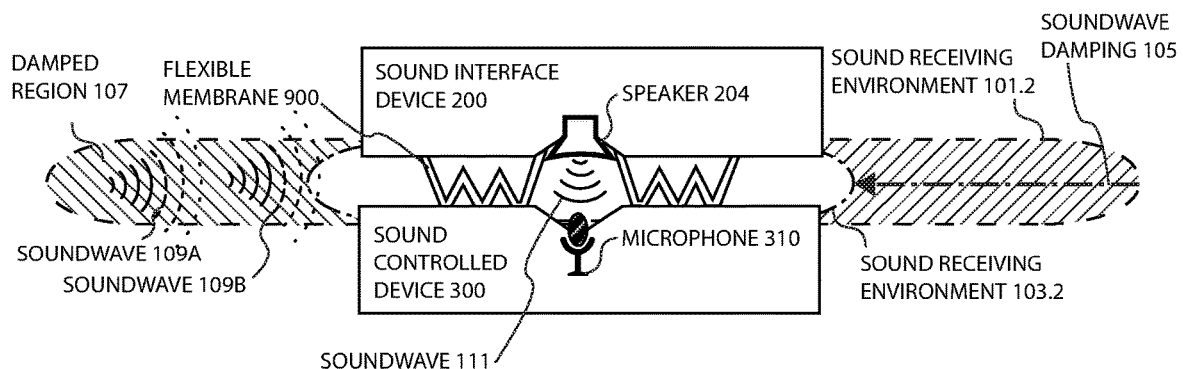
FIG. 9B illustrates the embodiment of FIG. 9A providing additional soundwave damping based on the reduced distance between the surface of the sound interface device and a surface of the sound controlled device, according to one or more embodiments.

FIG. 9A and FIG. 9B illustrates another implementation of the soundwave damping 105 utilizing a flexible membrane 900 to reduce the sound receiving environment 101.1 of the sound controlled device 300, according to one or more embodiments. The instance of the particular flexible membrane 900 of FIG. 9A and FIG. 9B may be corrugated and protrude at an oblique angle from a surface of the sound interface device 200. The flexible membrane 900 of one or more embodiments (including FIG. 9A and FIG. 9B) is substantially circular to completely enclose and/or surround the microphone 304, and in the embodiment a cross-section of the flexible membrane 900 is shown. The flexible membrane 900 may be a form of the barrier 800 that may further reduce sound due to its flexibility and/or seal formed with a surface of the sound controlled device 300. For example, the flexible membrane 900 may be made of soft plastic, rubber, or silicone. In one or more embodiments, and in the embodiment of FIG. 9A and FIG. 9B, the flexible membrane 900 may be of a shape that provides an increased degree of the soundwave damping 105 (e.g., an increased strength of the soundwave damping) based on a configuration of the flexible membrane 900 and/or sound interface device 200 relative to the sound controlled device 300. For example, in FIG. 9A only one fold of the corrugated instance of the flexible membrane 900 may form a seal and/or implement an instance of the barrier 800, whereas in the embodiment of FIG. 9B a reduced distance between the surface of the sound interface device 200 and a surface of the sound controlled device 300 may cause three folds of the corrugated instance of the flexible membrane 900 to form a seal and/or implement three instances of the barrier 800, according to one or more embodiments.

Figure 10A:
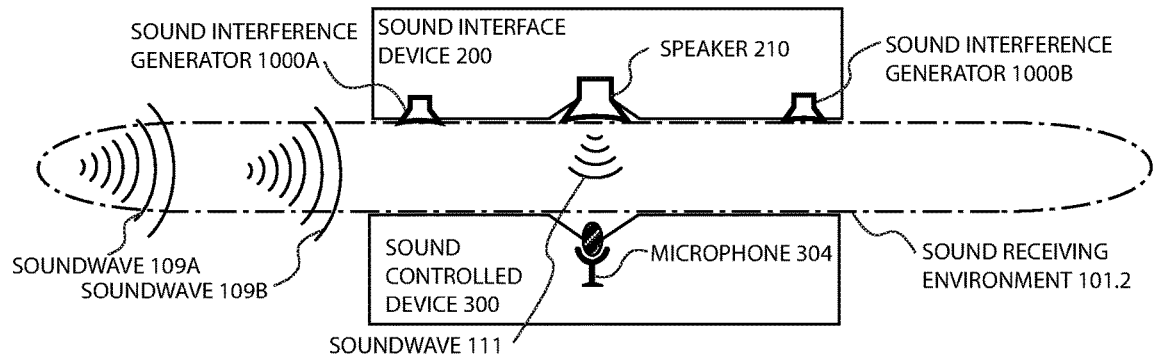
FIG. 10A illustrates yet another implementation of the soundwave damping utilizing a sound interference generator to generate a sound interference field surrounding a microphone of the sound controlled device of FIG. 3 to reduce a sound receiving environment of the sound controlled device, according to one or more embodiments.
Figure 10B:
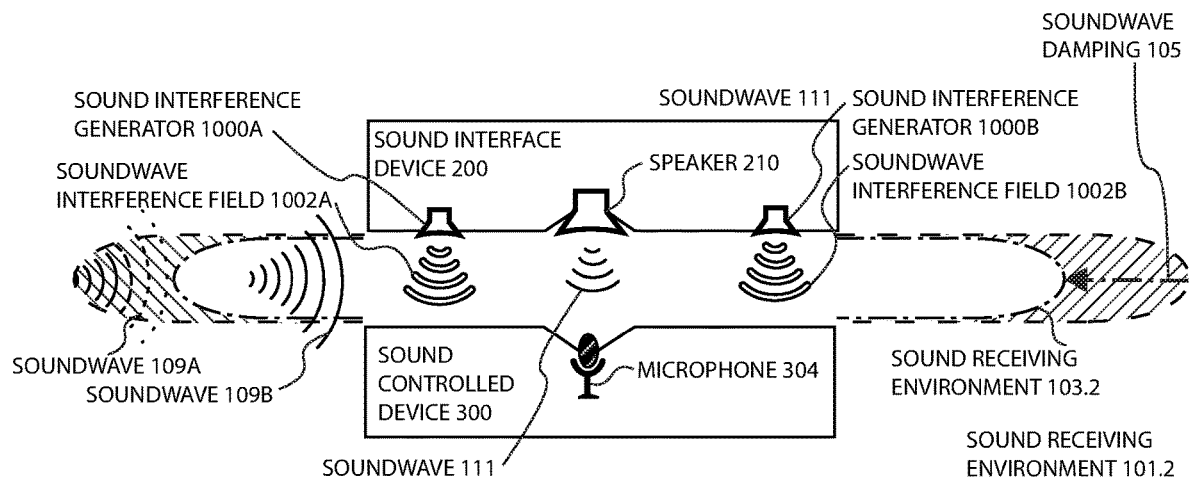
FIG. 10B illustrates the sound interference generator of FIG. 10A generating the sound interference field in an active state to reduce the sound receiving environment of the sound controlled device, according to one or more embodiments.

FIG. 10A and FIG. 10B illustrates yet another implementation of the soundwave damping 105 utilizing a sound interference generator 1000 to generate a soundwave interference field 1002 surrounding the microphone 304 of the sound controlled device of FIG. 3 to reduce the sound receiving environment 101.2 of the sound controlled device to the sound receiving environment 103.2, according to one or more embodiments. The soundwave interference field 1002 may be a white noise to cancel the soundwave 109. However, the soundwave 111 may be strong enough and/or otherwise configured to bypass the soundwave interference field 1002, for example where the soundwave interference field is temporarily disabled during communication of the soundwave 111 to the microphone 304. The soundwave interference field 1002 may also shut off when the sound controlled device 300 is to receive sound directly from its full sound receiving environment 101.1 (e.g., similar to a pass-through event shown and described in conjunction with FIG. 2). Additionally, although not illustrated in FIG. 7, FIG. 8, FIG. 9A, FIG. 9B, FIG. 10A and FIG. 10B are combinations of techniques, methods, and/or devices to implement the soundwave damping 105, for example the flexible membrane 900 with the soundwave interference generator 1000 proximate to an outside edge of the flexible membrane 900.

Figure 11:
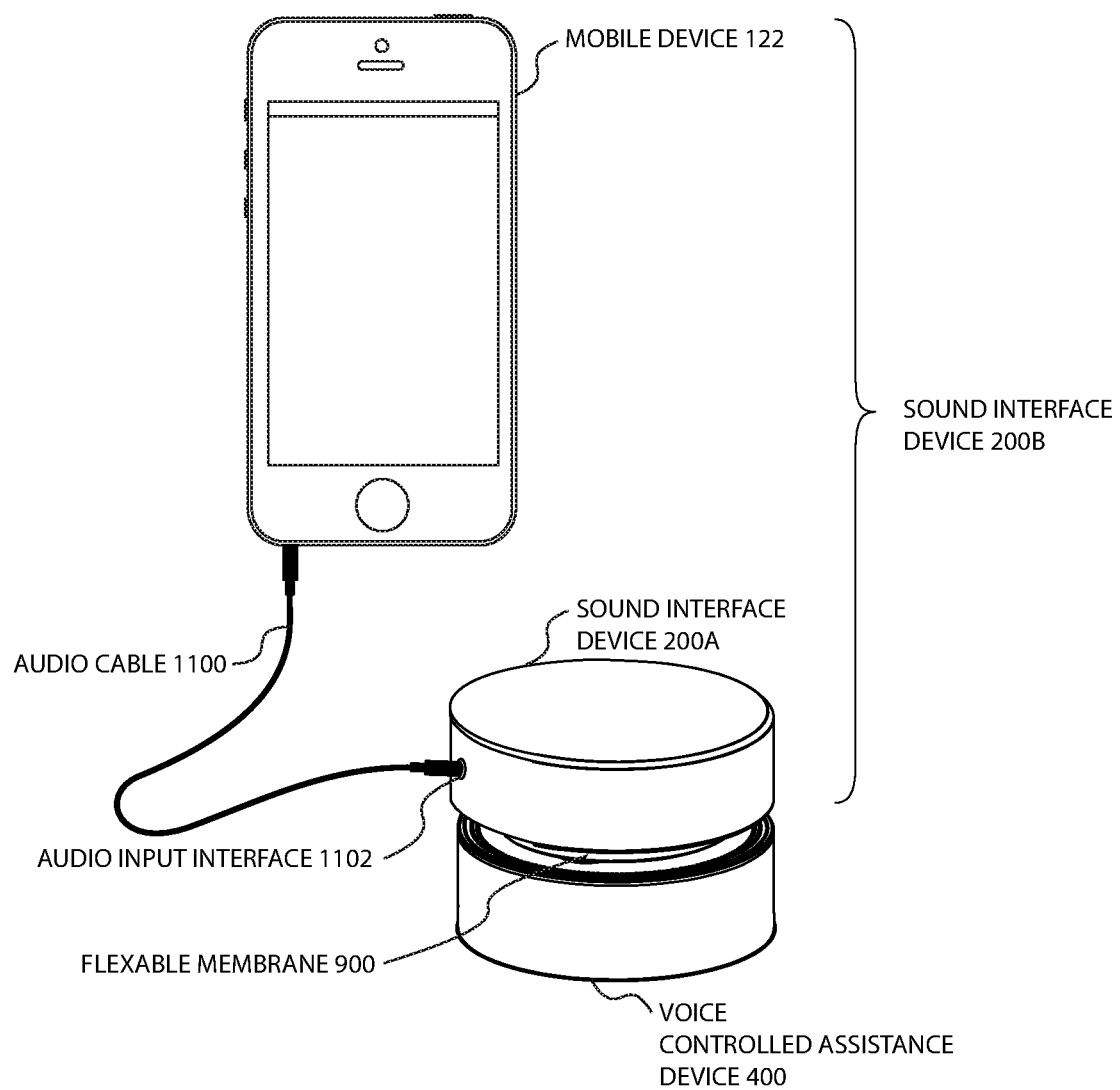
FIG. 11 illustrates a specific embodiment of the sound interface device of FIG. 2 utilizing a flexible membrane to dampen a sound receiving capability of the voice controlled device of FIG. 4, the sound controlled device receiving the command signal of FIG. 1 and/or a voice command through an audio cable from a mobile device through an audio input interface to initiation action in the voice controlled device, according to one or more embodiments.

FIG. 11 illustrates a specific embodiment of the sound interface device 200A of FIG. 2 and the voice controlled device of 400 of FIG. 4 (e.g., the voice controlled assistance device 400 of FIG. 4 that is an instance of the sound controlled device 300 of FIG. 3). In the embodiment of FIG. 11, a command signal 102 is generated by a mobile device 122, specifically an iPhone®. The command signal 102 is communicated over an audio cable 1100 and through the sound input interface 1102 (e.g., a headphone jack capable of receiving an auxiliary sound cable) to the sound interface device 200A. The command signal 102 in this instance may be the audio signal 108. In the alternative or in addition to the command signal 102, the mobile device 122 may pass the audio signal 208 directly to the sound interface device 200A. In the embodiment of FIG. 9A and FIG. 9B the sound interface device 200A utilizes the flexible membrane 900 to dampen a sound receiving capability of the voice controlled assistance device 400, specifically shown as an Amazon Echo Dot®. The Echo Dot may include perforations and/or holes in a top surface of its cylindrical housing for allowing sound to enter, with the flexible membrane 900 surrounding the holed portion and the speaker 210 (not shown in the embodiment of FIG. 11) also surrounded by the flexible membrane 900 and placed facing the perforated portion to create a small chamber. The flexible membrane 900 reduces the sound receiving capability of the voice controlled assistance device 400, for example from an ordinary instance of the sound receiving environment 101.2 (e.g., one large living room under ordinary speaking conditions of the user 120) to the sound receiving environment 103.2 that may be substantially reduced (e.g., the user 120 must stand directly next to the voice controlled assistance device 400 under influence of the soundwave damper 206 for the microphone 304 to receive and/or the voice controlled assistance device 400 to detect to analyze the soundwave 109 generated by the user 120).

Two additional aspects of FIG. 11 should be recognized. First, considered together, the sound interface device 200 communicatively coupled to the voice controlled assistance device 400 may be referred to as an instance of the meta sound control device 100 of FIG. 1. Additionally, the sound interface device 200A and the mobile device 122 may together comprise the sound interface device 200B. For example, a speaker of the mobile device 122 may be the speaker 210 of the sound interface device 200B, a processor of the mobile device 122 may be the processor 201 of the sound interface device 200, and the memory of the mobile device (e.g., RAM, a solid-state drive) may be the memory 203 of the sound interface device 200B.

Figure 12:
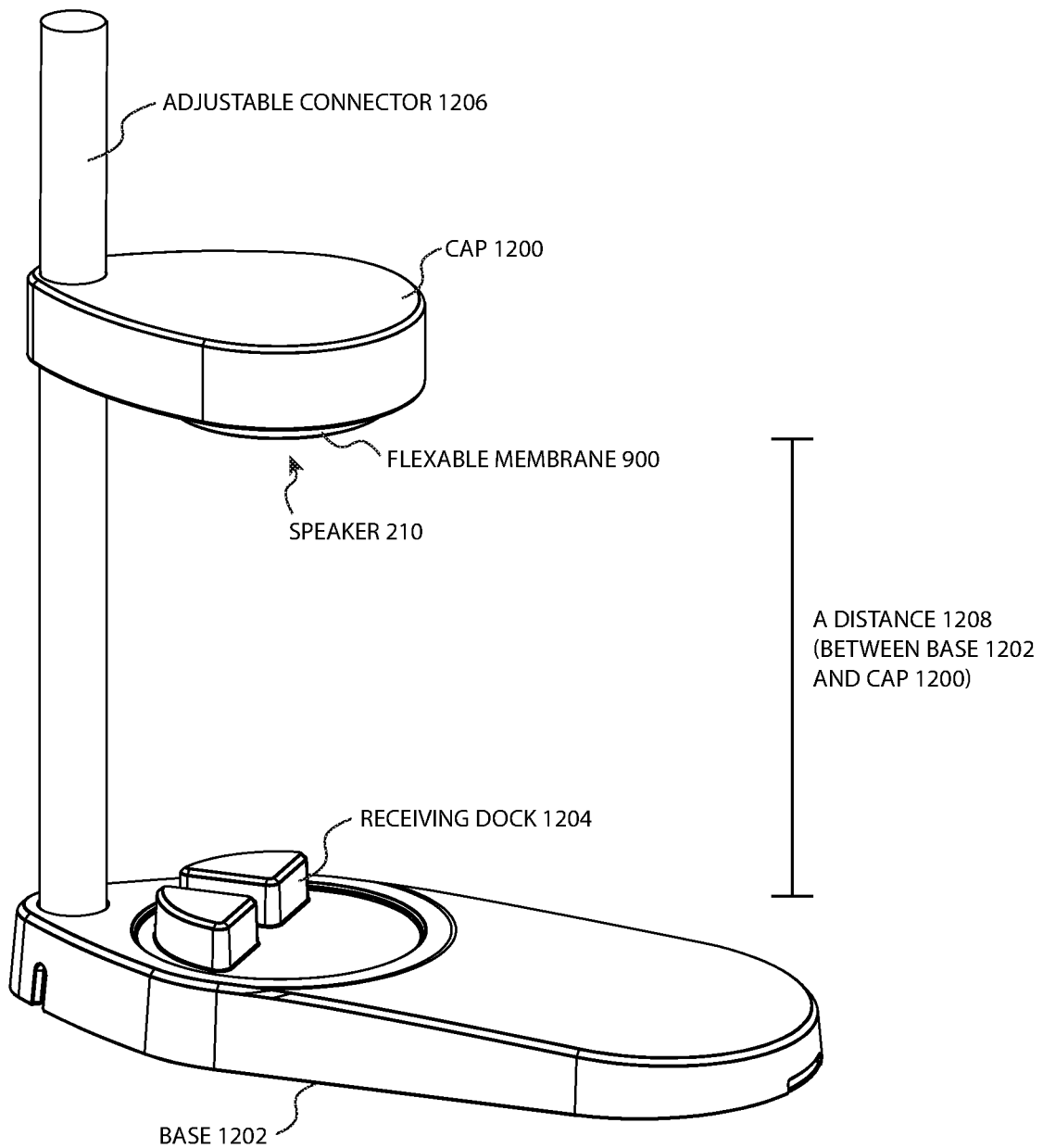
FIG. 12 illustrates another specific embodiment of the sound interface device of FIG. 1 including a cap that houses a speaker and a barrier that is the flexible membrane of FIG. 9A and FIG. 9B, a base including a receiving dock, and an adjustable connector for adjusting a distance between the cap and the base to place the speaker of the cap in a close proximity to the microphone of the voice controlled assistance device of FIG. 4, according to one or more embodiments.

FIG. 12 illustrates another specific embodiment of the sound interface device 200 of FIG. 1 including a cap 1200 housing that is the flexible membrane 900 that is an instance of the barrier 800, a base 1202 including a receiving dock 1204, and an adjustable connector 1206 for adjusting a distance 1208 between the cap 1200 and the base 1202 to position the speaker 210 of the cap 1200 in a close proximity to the microphone 304 of the voice controlled assistance device 400, according to one or more embodiments. Although not shown, the signal input 202 may be a wireless transmitter-receiver (e.g., that may be an instance of the NIC 214 to receive the command signal 102) and/or a speaker 210. In the embodiment of FIG. 12, the cap 1200 slides on the adjustable connector 1206 to change the distance 1208 between the base 1202 and the cap 1200. The processor 201 and the memory 203, not shown in the embodiment of FIG. 12, may be inside a housing of the cap 1200 and/or the base 1202. The adjustable connector 1206 between the base 1202 and the cap 1200 may allow for an adjustment of a relative orientation of the base 1202 and the cap 1200. The adjustable connector 1206 may also allow for adjustment of the distance 1208 between the base 1202 and the cap 1200. The adjustment may be such that the speaker 210 and the soundwave damper 206 (e.g., the flexible membrane 900) can be placed proximate to the microphone 304 of the sound controlled device 300 when the sound controlled device 300 is attached to, received by, and/or secured by the receiving dock 1204. In one or more other embodiments, the adjustable connector 1206 can be flexed to adjust the relative orientation of the base 1202 and the cap 1200 and/or to adjust the distance between 1208 between the base 1202 and the cap 1200 (e.g., to accommodate an Amazon Echo as shown in FIG. 13 or a smaller Amazon Echo Dot, such as shown in FIG. 11).

In one or more embodiments, there may be a configuration lock that is a mechanism to lock the sound controlled device 300 to the receiving dock 1204 and/or immobilize a configuration of the adjustable connector 1206, for example to lock the sound controlled device 300 in place. The lock may include a key such that only users processing the key can remove the sound controlled device 300. Additional locks may be voice and/or app controlled. Especially where the soundwave damping 105 is powerful, the lock may allow additional security measures before a person can activate an otherwise accessible instance of the sound-controlled device 300 through a sound command. Different types of the cap 1200, the base 1202, the receiving dock 1204, and the adjustable connector 1206 may be designed and configured to secure different sizes, configurations and types of the sound controlled device 300. In the embodiment of FIG. 12 the adjustable connector 1206 includes a rod on which the cap 1200 and/or the base 1202 slides to adjust the relative orientation of the base 1202 and the cap 1200 and/or adjust the distance 1208 between the base 1202 and the cap 1200.

Figure 13:
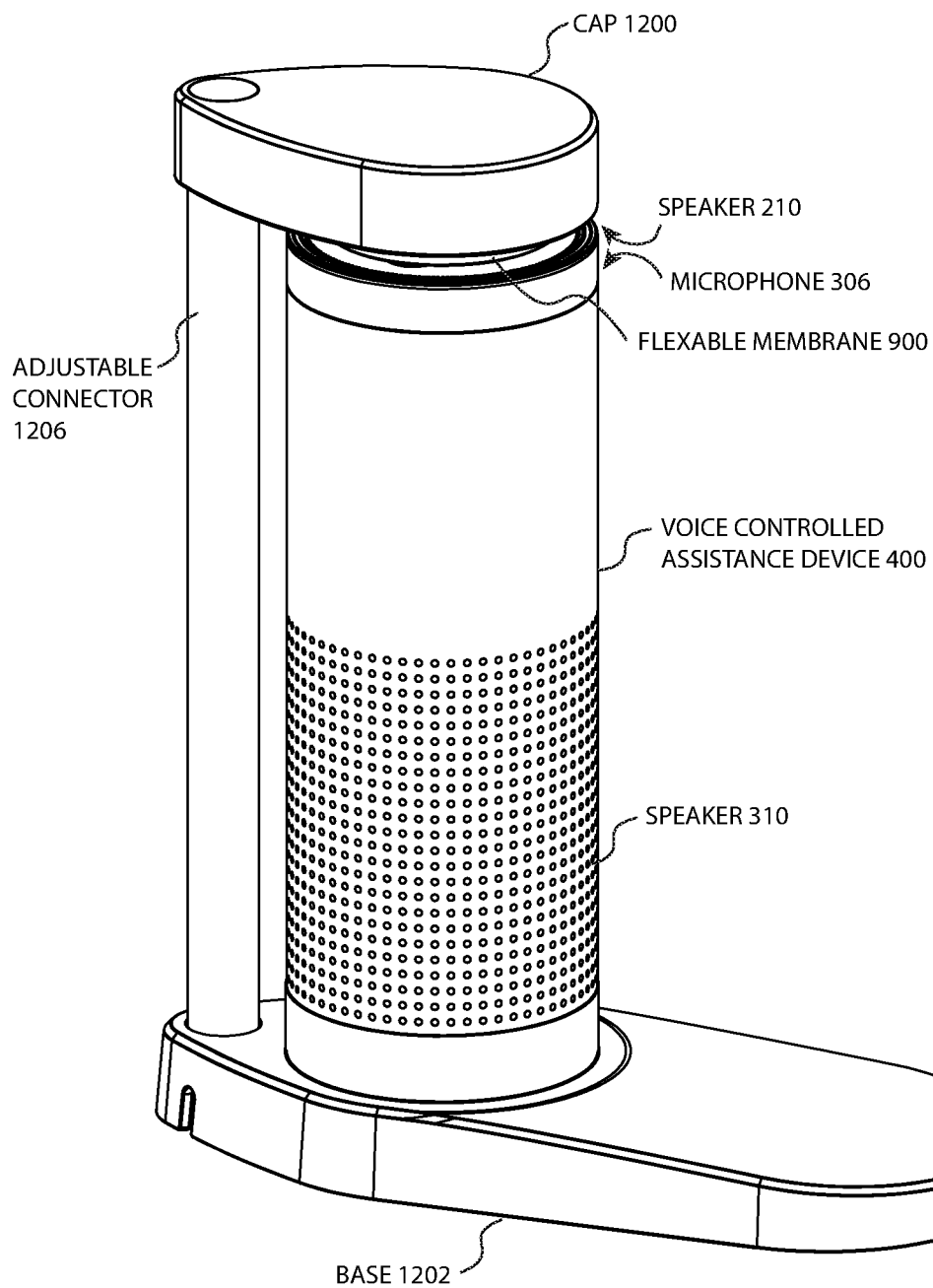
FIG. 13 illustrates the specific embodiment of the sound interface device of FIG. 12 further including a specific instance of the voice controlled assistance device of FIG. 4, specifically an Amazon® Echo, according to one or more embodiments.

FIG. 13 illustrates the specific embodiment of the sound interface device 200 of FIG. 12 further including an instance of the voice controlled assistance device 400 of FIG. 4 that is an Amazon® Echo, according to one or more embodiments. First, the voice controlled assistance device 400 may be placed into the receiving dock 1204 of the base 1202. Second, the adjustable connector 1206 may be adjusted such that the cap 1200 and the base 1202 secure either or both disk faces of a cylindrical design of the voice controlled assistance device 400. The speaker 210 on the underside of the cap 1200 along with the flexible membrane 900 implementing the soundwave damping 105 adjusted until proximate to a microphone 304 of the voice controlled assistance device 400 for successful communication of the soundwave 111. Alternatively, the cap 1200 may be slightly raised to increase a sound receiving capability of the voice controlled assistance device 400 and/or increase the sound receiving environment 103.2. The user 120 may use a mobile device 122 to set a custom wake word (e.g., as the sound signature 218). The user may select on the user interface of the mobile device 122 a known wake word for the Amazon Echo (e.g., "Alexa") and opt for a sound to thereafter be passed directly through and/or switch off damping of the voice controlled assistance device 400. Upon the user 120 speaking the custom wake within a sound receiving environment 101.1 of the sound interface device 200, the sound interface device 200 will "whisper" the "Alexa" wake word (e.g., via the soundwave 111) to the voice controlled assistance device 400 and then pass through all additional speech of the user 120 within the sound receiving environment 101.1 of the sound interface device 200 through the microphone 204 to the microphone 304 via the speaker 210 (e.g., as the pass-through instance of the soundwave 109B of FIG. 2). The voice controlled assistance device 400 of FIG. 12 may be connected to a local wireless network (e.g., an instance of the network 115A) that may be connected to the internet (e.g., an instance of the wireless network 115B). The voice controlled assistance device 400 may then connect to a server (e.g, the server 450 of FIG. 4 to relay the pass-through sound 119 of the user 120 to the speech recognition engine 432 and/or the assistance service engine 434 to determine an appropriate response. The speaker 310 of the voice controlled assistance device 400 may remain unobstructed to return a sound response (e.g., the sound response 311) to the user 120. As a result, the user 120 may have an increased security and/or privacy because the sound interface device 200 only allows the voice controlled assistance device to relay communications to a cloud server (e.g., the server 450) upon receiving the custom command word (e.g., even if the voice controlled assistance device 400 may be listening at all times but have a limited sound receiving environment 101.2 due to the soundwave damping 105).

Figure 14:
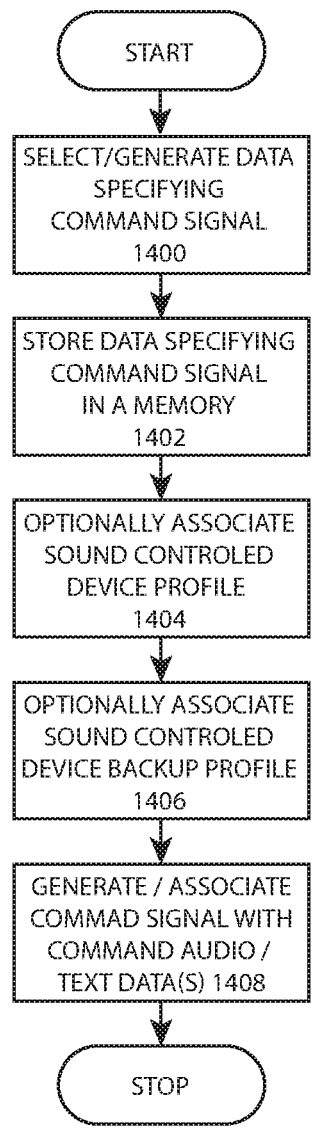
FIG. 14 is an interface command configuration process flow illustrating a process that can be utilized to define a data specifying a command signal to which the sound command of the sound controlled device of FIG. 3 will be response, an association drawn to a sound command to be received by the microphone of the sound controlled device, according to one or more embodiments.

FIG. 14 is an interface command configuration process flow illustrating a process that can be utilized to associate a command signal 102 to be received by the sound interface device 200 of FIG. 2 with a sound command 104.2 to be received by the microphone 304 of the sound controlled device 300 of FIG. 3, according to one or more embodiments. Operation 1400 generates and/or selects a command signal 102 which will trigger the sound command 104.2. The selection of the command signal 102 may occur, for example, by: (i) selecting and/or generating a unique identifier (UID) to be the command data 110 of FIG. 2; and/or (ii) by selecting an audio file that will be the audio file 205 storing the sound signature 218 of FIG. 2; and/or (iii) generating an audio file 205 to be used as the sound signature 218; and/or (iii) by selecting a text string data 112 to carry the sound command 104.2 and/or be utilized as a "text command signature" as further described below. Operation 1400 may further select data specifying the type (s) of command signal 102 will initiate the sound command 104.2.

Operation 1402 stores data specifying within a memory the command signal 102 to which the sound 104.2 will be generated in response to (e.g., the memory 203 of FIG. 2, the memory 303 of FIG. 3, the memory 403 of FIG. 4, the memory 443 of FIG. 4, the memory 553 of FIG. 5). The memory is a physical memory, for example random access memory (RAM), SATA, a mersister, a disk drive, and/or a solid state drive. The memory of the present embodiments may be either a relatively short term and/or volatile memory (e.g., the RAM) or may be relatively long term and/or permanent storage memory (e.g., a hard disk, a solid state drive). The data specifying the command signal 102 to which the sound command 104.2 will be responsive may be organized into a data structure and/or within a database to reduce a reference time of the. Operation 1404 optionally specifies a device profile 604 (e.g., the primary device profile 604A of FIG. 6). The device profile 604 specifies which instance of the sound controlled device 300 of one or more instances of the sound controlled device 300 will receive the sound command 104.2, for example as shown and described in conjunction with FIG. 6. Operation 1404 for example may define a relation data 222 between the data specifying the command signal 102 to which the sound command 104.2 will be responsive and the primary device profile 604A. Operation 1406 operationally associates a backup instance of the device profile 604 that is a sound controlled device 300 (e.g., the secondary device profile 604B of FIG. 6). Operation 1404 may further define a relation data 222 to the secondary device profile 604B. Optionally, in an operation 1407 not shown in FIG. 14, where the primary device (e.g., the sound controlled device 300A) and the secondary device (e.g., the sound controlled device 300B) have differing sound command protocols, a data specifying a type of command may also be defined (e.g., the command type data 602 of FIG. 6). Operation 1408 generates and/or associates the data specifying the command signal 102 to which the sound command 104.2 will be responsive with data usable to generate the sound command 104.2, for example an audio file (e.g. the audio file 205 of FIG. 1, the audio file 205B of FIG. 2) and/or a text file (e.g., the command text file 224 of FIG. 2). Where operation 1404 and/or operation 1406 have made reference to instances of the device profile 604, operation 1408 may set the data usable to generate the sound command 104.2 for each instance of the device profile 604.

In one or more alternate embodiments, operation 1400 the data to which the command signal 102 will trigger the sound command 104.1, for example a UID associated with an instance of the assistance action profile 504. In such case, operation 1408 may generate and/or define a reference (e.g., the relation data 222 of FIG. 5) to the assistance action profile 504 that may be utilized to generate the sound command 104.2.

Figure 15:
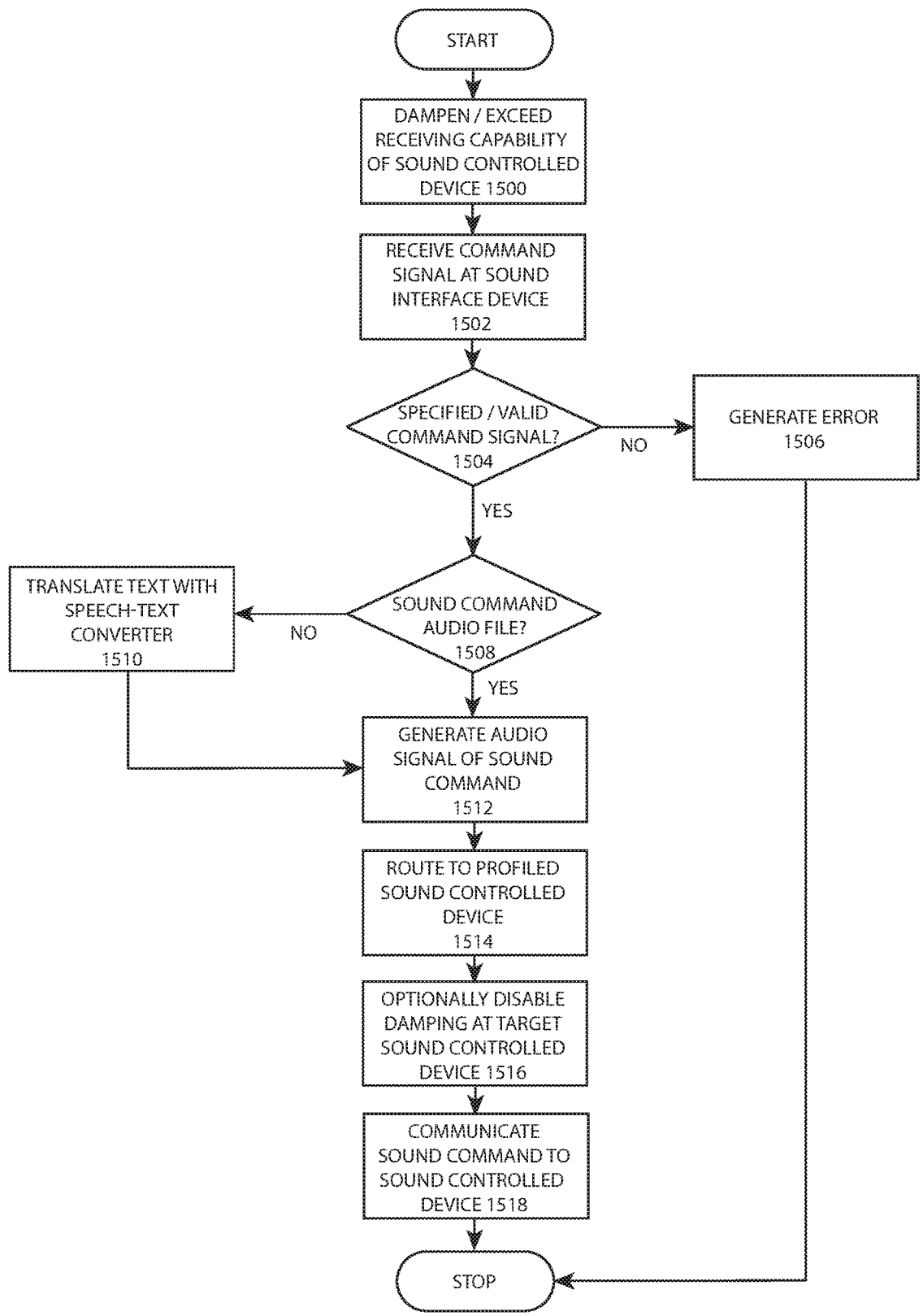
FIG. 15 is a sound interface operation process flow illustrating a process by which a command signal may be received and validated to generate a sound command to induce an action in and/or a response from a sound controlled device, for example a process by which the sound interface device of FIG. 2, FIG. 4 and/or FIG. 6 may operate, including possible conversion of a command text file into a voice command via a text-speech converter for communication to the sound controlled device, according to one or more embodiments.

FIG. 15 is a sound interface operation process flow illustrating a process by which a command signal 102 may be received and validated to generate a sound command 104.2 to induce an action in and/or a response from a sound controlled device 300, according to one or more embodiments. For example, the process flow of FIG. 15 may be a process by which the sound interface device of FIG. 2, FIG. 4 and/or FIG. 6 may operate, including possible conversion of a command text file 224 into a voice command 106.2 via a text-speech converter 212 for communication to the sound controlled device 300, according to one or more embodiments. Operation 1500 dampens and/or exceeds a sound receiving capability of a sound controlled device (e.g., the sound controlled device 300 of FIG. 3, a voice controlled device, the voice controlled assistance device 400 of FIG. 4). Operation 1500 may utilize, for example, one or more of the embodiments of FIG. 7, FIG. 8, FIG. 9A, FIG. 9B, FIG. 10A, and/or FIG. 10B to implement the soundwave damping 105. Operation 1502 receives a command signal 102 to which a sound command 104.1 of the sound controlled device 300 will be generated in response to. For example, the command signal 102 may be the command data 110, the audio signal 108, and/or the text string data 112, and the command signal 102 may be received at the signal input 202 as shown and described in conjunction with FIG. 2. Operation 1504 determines if the command signal 102 received in operation 1502 is a valid and/or specified instance of the command signal 102 to which one or more instances of the sound profile 104.2 are associated. For example, the comparison algorithm 216 may compare the audio signal 108 to several instances of the audio file 205 each specifying an instance of the sound signature 218 to determine if the audio signal 108 matches an instance of the sound signature 218. For example, the comparison may be made by a comparison algorithm 216 implemented with an extensive lexicon model or hidden Markov model for speech recognition as may be known in the art. In another example, operation 1504 may determine a valid reference (e.g., a specified instance of the relation data 222) corresponding to the UID received as the command data 110. If no specified match is determined, operation 1504 proceeds to operation 1506 which may generate an error message (e.g., utilizing a speaker 210B) and/or take no additional action. If operation 1504 determines a valid and/or specified match to the command signal 102, operation 1504 proceeds to operation 1508.

Operation 1508 determines if the sound command 104.2 associated with the command signal 102 is an audio file 205 or a text string data 112 (in which case it may be the voice command 106.2). Where existing as the text string data 112, operation 1508 proceeds to operation 1510 that may translate with the speech-text converter 212 the text string data 112 into the an audio file 205 encoding the voice command 106.2 and/or an audio signal 208 encoding the voice command 106.2. Otherwise, operation 1508 proceeds to operation 1512 which extracts the associated instance of the audio file 205 from a memory (e.g., the memory 203) and generates the audio signal 208. Operation 1514 determines an appropriate sound controlled device 300 (e.g., a "target") to route the audio signal 208 to, for example by looking up a device profile 604 associated with the audio file 205 and/or the text string data 112. In one or more embodiments, operation 1516 optionally disables damping at the target instance of the sound controlled device 300, for example by disabling the sound wave interference fields 1002 of FIG. 10A and FIG. 10B and/or by actuating parameters of the flexible membrane of FIG. 9A and FIG. 9B to change such as use of a motor to adjust a distance between a face of the sound controlled device 300 and a face of the sound interface device 200. Operation 1518 communicates using a speaker (e.g., with a speaker 210) the sound command 104.2 encoded in a soundwave (e.g., the soundwave 111) to a microphone 304 of the sound controlled device 300.

Figure 16:
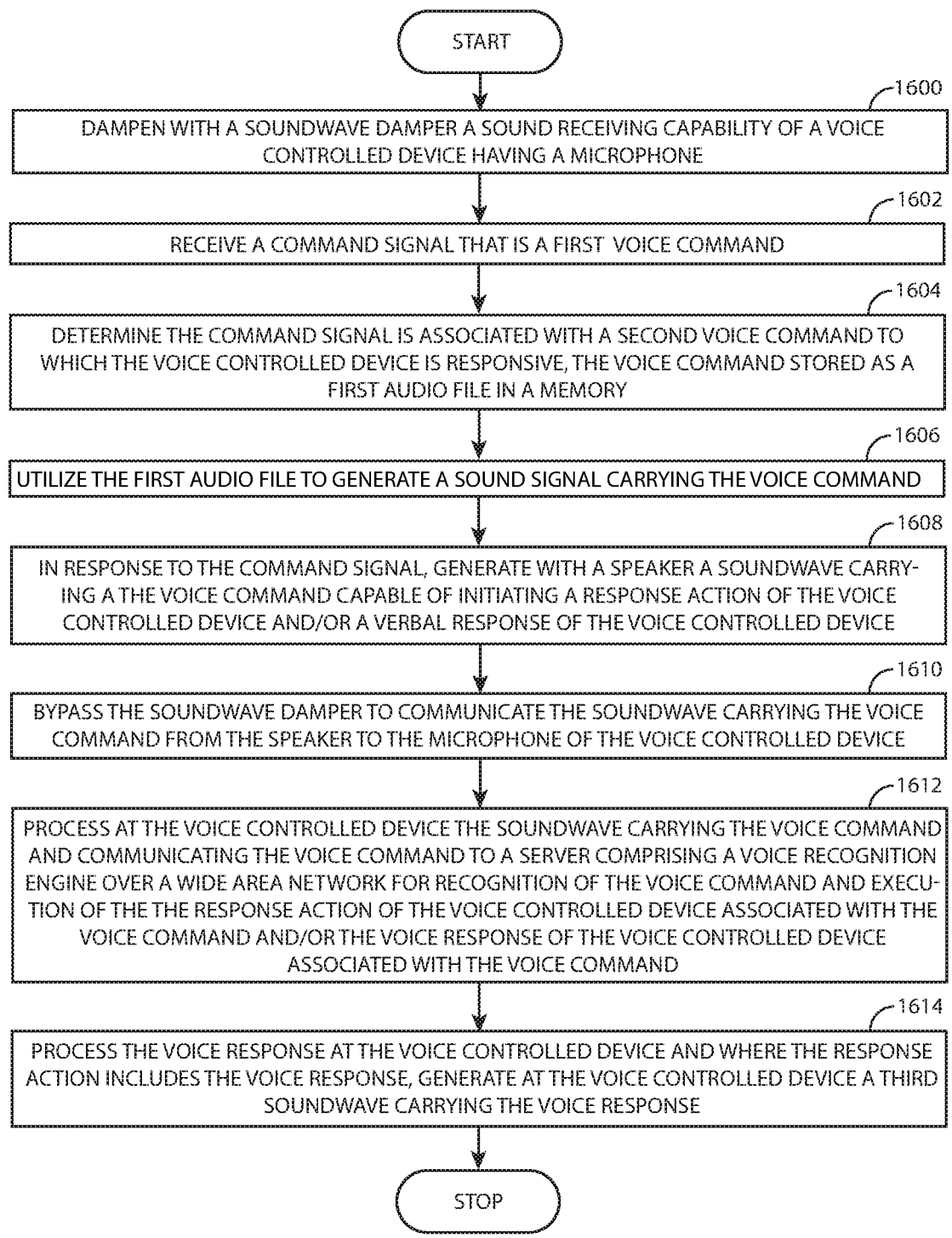
FIG. 16 is a meta voice control operation process flow illustrating a process by which the voice controlled assistance device of FIG. 4 receiving a voice command as the command signal may be utilized to change a voice command protocol of the voice controlled device for a user, according to one or more embodiments.

FIG. 16 is a meta voice control operation process flow illustrating a process by which the voice controlled assistance device 400 of FIG. 4 receiving a voice command 106.1 as the command signal 102 that may be utilized to change a voice command protocol of the voice controlled assistance device 400 for a user 120, according to one or more embodiments. Operation 1600 dampens with a soundwave damper 206 a sound receiving capability of a voice controlled assistance device 400 (e.g., an instance of the sound controlled device 300) having a microphone 304. Operation 1600 may utilize, for example, one or more of the embodiments of FIG. 7, FIG. 8, FIG. 9A, FIG. 9B, FIG. 10A, and/or FIG. 10B to implement the soundwave damping 105. Operation 1602 receives a command signal 102 that is a first instance of the voice command 106, specifically the voice command 106.1. Operation 1602 determines the command signal 102 is associated with a second instance of the voice command 106, specifically the voice command 106.2, to which the voice controlled device is responsive, the voice command 106.2 stored as a first audio file (e.g., the audio file 205A of FIG. 2) in a memory. For example the association may be determined by a match between an audio signal 108 carrying the voice command 106.1 and an audio file 205 encoding a sound signature 218, the audio file 205 pointing to an audio file 205 encoding the voice command 106.2.

Operation 1606 utilizes the audio file (e.g., the audio file encoding the voice command 106.2) to generate an audio signal 208 carrying the voice command 106.2. Operation 1608, in response to the command signal 102, generates with a speaker (e.g., the speaker 210) a soundwave 111 carrying a voice command 106.2 capable of initiating a response action of the voice controlled assistance device 400 (e.g., a speech response) and/or a verbal instance of the sound response 113 of the voice controlled assistance device 400. The soundwave 111 may be generated by the speaker 210 located proximate to the a microphone (e.g., the microphone 304) of the sound controlled device 300, for example a few fractions of an inch, an inch, two feet. Operation 1610 bypasses the soundwave damper 206 (and its associated soundwave damping 105) to communicate the soundwave 111 carrying the voice command 106.2 from the speaker 210 to the microphone 304 of the voice controlled assistance device 400. The soundwave damper 206 may also be bypassed by disabling the soundwave damper 206, for example by temporarily shutting off the soundwave interference generator 1002 of FIG. 10A and FIG. 10B.

Operation 1612 processes at the voice controlled assistance device 400 the soundwave 111 carrying the voice command 106.2 and communicating the voice command 106.2 to a server (e.g., the server 450) comprising a speech recognition engine 432 over a wide area network (e.g., an instance of the network 115) for recognition of the voice command 106.2 and execution of the at least one of the response action of the voice controlled assistance device 400 associated with the voice command 106.2 and the speech response (e.g., an instance of the sound response 311) of the voice controlled assistance device 400 associated with the voice command 106.2. Operation 1614 processes the speech response at the voice controlled assistance device 400 and generates at the voice controlled assistance device 400 a third soundwave carrying the speech response (e.g., the instance of the sound response 311).

Figure 17:
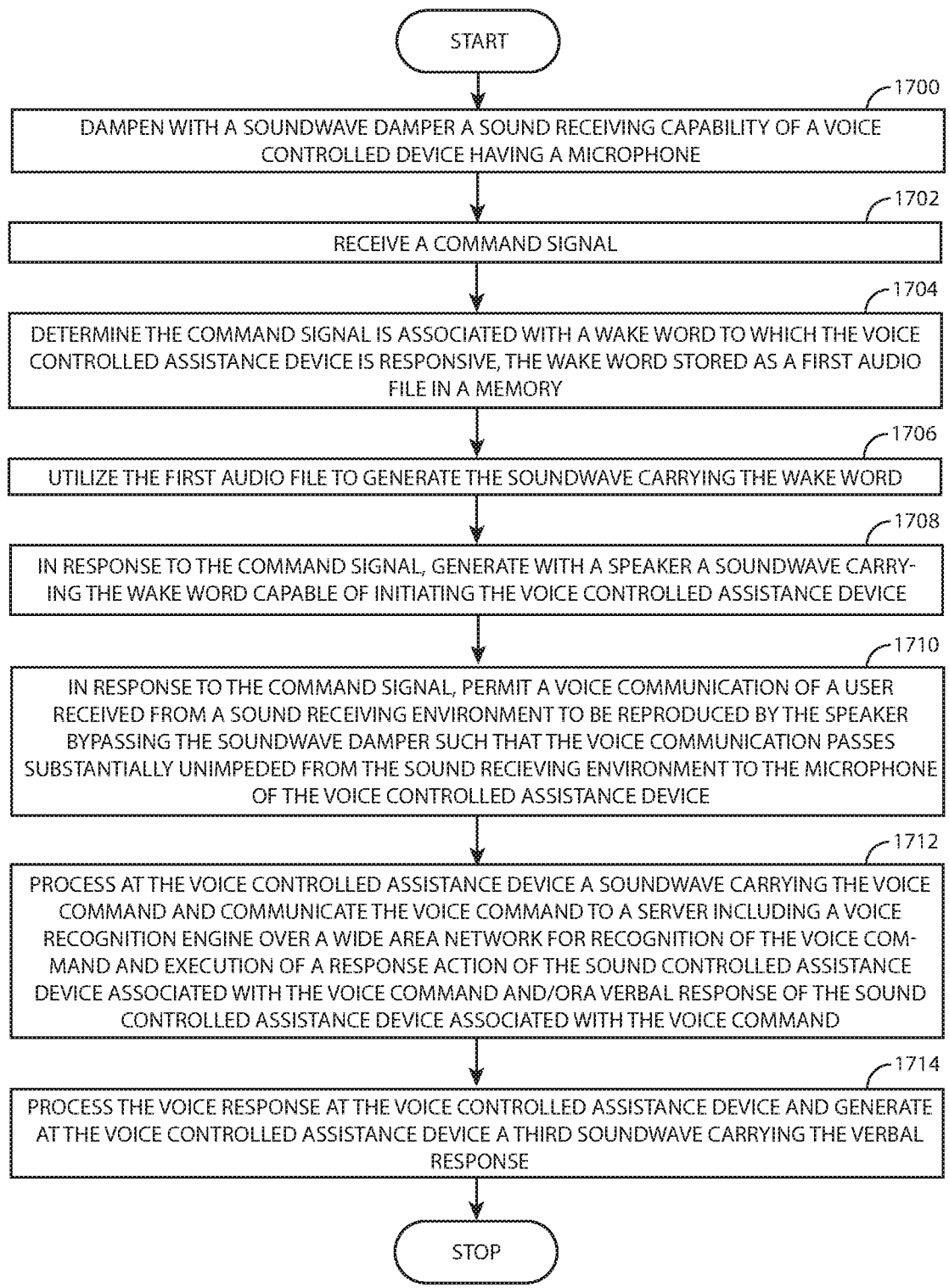
FIG. 17 is a custom wake word and pass-through speech routing process flow illustrating a process by which a custom wake word defined at the sound interface device may invoke the assistance service engine accessible through the voice controlled assistance device, a speech of a user then passed substantially unimpeded through the sound interface device to the voice controlled assistance device to provide enhanced customization and/or security, according to one or more embodiments.

FIG. 17 is a custom wake word and pass-through speech routing process flow illustrating a process by which a custom wake word defined at the sound interface device 200 may invoke the assistance service engine 434 accessible through the voice controlled assistance device 400, a speech of a user 120 then passed substantially unimpeded through the sound interface device 200 to the voice controlled assistance device 400 to provide enhanced customization and/or security of the voice controlled assistance device 400, according to one or more embodiments. Operation 1700 may operate similarly to operation 1600 of FIG. 16. Operation 1702 receives a command signal 102. Operation 1704 determines the command signal 102 is associated with a wake word to which the voice controlled assistance device 400 is responsive, the wake word (e.g., an instance of the voice command 106.2 that may induce a wake response) stored as a first audio file (e.g., the audio file 205B) in a memory (e.g., the memory 203). Operation 1706 utilizes the audio file to generate the soundwave (e.g., the soundwave 111) carrying the wake word. Operation 1708, in response to the command signal 102, generates with a speaker (e.g., the speaker 210) a soundwave 111 carrying the wake word capable of initiating the voice controlled assistance device 400. Operation 1710, in response to the command signal, permits a verbal communication (e.g., an instance of the soundwave 109) of a user 120 received from a sound receiving environment (e.g., the sound receiving environment 101.1) to be reproduced by the speaker 210 bypassing the soundwave damper 206 such that the verbal communication passes substantially unimpeded from the sound receiving environment 101.1 to the microphone 304 of the voice controlled assistance device 400. The substantially unimpeded sound may be the pass-through sound 119 as shown and described in conjunction with FIG. 2. Operation 1712 and operation 1714 may function similarly to operation 1612 and operation 1614, respectively, except that operation 1612 and operation 1614 may apply to an instance of the sound controlled device 300 that is a voice controlled device, and operation 1712 and operation 1714 may apply to an instance of the voice controlled device that is the voice controlled assistance device (e.g., the voice controlled assistance device 400 of FIG. 4).

FIG. 18 is a voice controlled device routing and backup re-routing process flow illustrating a process by which the sound interface device 200 may determine a first voice controlled device (e.g., the voice controlled assistance device 400A of FIG. 4) to route a voice command 106.2A to, receive a failure response (e.g., the sound response 113) after routing the voice command 106.2A, and re-route the voice command 106.2A and/or a different voice command 106.2B to a second voice controlled device (e.g., the voice controlled assistance device 400B of FIG. 4) to permit two or more voice controlled devices to simulations operate within a shared sound communication environment, according to one or more embodiments. Operation 1800 dampens with a soundwave damper 206 a sound receiving capability of two or more voice controlled devices each having an instance of the microphone 204. Operation 1802 receive a command signal 102. Operation 1804 determines the command signal 102 is exclusively associated with a first voice controlled device when two or more voice controlled devices are suppressed with soundwave damping 105. For example, the command signal 102 may be associated with the command type data 602 through the relation data 222A, which may in turn be associated with the primary device profile 604A, as shown and described in conjunction with the embodiment of FIG. 6. Operation 1806 receives a text string data 112 encoding the voice command 106.2 of the voice controlled device. The text string data 112 may be received through the signal input 202 and/or extracted form a location in the memory 203. Operation 1808 translates the text string data 112 into an audio file 205 with a text-speech converter 212. The audio file 205 may be stored in the memory 203 or may be immediately converted into an audio signal 208A. Operation 1810 routes an audio signal 208A usable by the speaker 210A to generate the soundwave 111A carrying the voice command 106.2A, where operation 1810 initiates when it is determined that the command signal 102 is exclusively associated with the first voice controlled device when two or more voice controlled devices are suppressed with soundwave damping 105. Operation 1812 determines a response failure from the voice controlled device. The determination may be made in a number of ways. For example, a known error message returned as the sound response 113 may be stored on the sound interface device 200 as a specific instance of the sound signature 218. Upon receiving the error message and matching it to the specific instance of the sound signature 218 the voice controlled device may determine the response failure has occurred and initiate re-routing. Operation 1814 determines the command signal 102 is associated with a backup device of the two or more voice controlled devices (e.g., the backup device 600 of FIG. 6 shown as the voice controlled assistance device 400B). For example, the backup device 600 may be determined by following a relation data 222B associating the command signal 102 with a secondary device profile 604B, as shown and described in conjunction with FIG. 6. Operation 1816 generates a second audio signal (e.g., an audio signal 208B) usable by the speaker (e.g., the speaker 210A) and/or a second speaker (e.g., the speaker 210B) to generate the soundwave 111A carrying the voice command 106.2A and/or a second soundwave 111B carrying a second voice command 106.2B to a second voice controlled device of the two or more voice controlled devices. Operation 1818 then re-routes the audio signal 208A (e.g., the audio signal 208A may be re-generated as necessary where it was originally generated as a transient signal) and/or routes the second audio signal 208B to the speaker 210A and/or a second speaker 210B to communicate the voice command 106.2A and/or the second voice command 106.2A to a second voice controlled device of the two or more voice controlled devices.

FIG. 19 is an assistance action profile process flow illustrating generation of the assistance action profile 504 of FIG. 5 to automate, upon occurrence of an initiation condition 502, one or more assistance actions 442 of one or more assistance applications 440 accessible through the voice controlled assistance device 400 of FIG. 4 and/or accessible through the assistance service engine 434, according to one or more embodiments. Operation 1900 generates a unique data identifier (UID) for the assistance action profile 504 and/or receives a sound signature 218 to be associated with the assistance action profile 504 as a custom command word that will invoke stored commands in the assistance action profile 504. For example, in the embodiment of FIG. 5 the audio file 205A is associated with the assistance action profile 504 with the relation data 222B. Operation 1902 generates a new file in memory (e.g., the memory 203), where the new file may be a text file, an audio file, a software code file, and/or another data format that may be used to specify the additional operations of FIG. 19 for interacting with and commanding an assistance application 440. Operation 1904 adds an invocation command 540 of the assistance application 440 in a format receivable by the data type of the new file created in operation 1902. Operation 1904 may look up the invocation command 540 from a list stored in the memory, including accessible over the network 115. Following operation 1904 may be a break 1901A. Each instance of the break 1901 in FIG. 19 my be a pause specified in the new file to allow each sound command 140.2 to take effect. For example, where the assistance action profile 504 is specified in a text format, the break 1901 may be text that when parsed by the text-speech converter 212 will place an appropriate pause, for example specified as "<br>" in the text file. In one or more other embodiments, where the new file is stored in an audio file format, the break 1901 may be several seconds added to the audio file 205 in the location of the break 1901, or data specifying a pause between multiple instances of the audio file 205. The break 1901 may also include a data marker that may activate the microphone 204 of the sound interface device 200 such that any receipt of sound by the microphone 204 (e.g., the sound response 311) will prevent execution of the next command in the assistance action profile 504 until the sound ceases (e.g., the voice controlled assistance device 400 may be ready for a next command). However, in one or more embodiments instances of the break 1901 may not be required for proper execution of the assistance action profile 504.

Operation 1906 adds an invocation command 540 of an assistance application 440, the invocation command 540 conforming to a voice command protocol of the assistance application 440. Operation 1906 may be followed by the break 1901B. Operation 1908 determines whether a voice input 444 is required for execution of the assistance action 442 under the voice command protocol of the assistance application 440. This determination may be made manually (e.g., from a user 120 designating a voice input 444 is required) or automatically through data describing the voice command protocol of the assistance application 440 and/or automatically by accessing and evaluating the voice command protocol. Where no input is required for the assistance action 442 to proceed, operation 1910 determines if an additional instance of the assistance action 442 should be taken. If so, operation 1910 returns to operation 1906. If not, operation 1910 proceeds to operation 1912 which makes a similar determination for whether an additional instance of the assistance application 440 should be invoked to take a different assistance action 442 under the additional instance of the assistance application 440. Following operation 1912 the break 1901D may be associated; operation 1912 may then return to operation 1904. However, if no additional assistance application 440 is to be invoked, operation 1912 proceeds to operation 1924 which saves the assistance action profile 504 in a memory (e.g., the memory 203, the memory 503).

Where the assistance action 442 requires one or more voice inputs 444, operation 1914 through operation 1922 defining the input with corresponding voice instructions 544. Operation 1914 determines whether the voice instruction 544 should be automatically provided during execution of the commands of the assistance action profile 504, or whether the voice instruction 544 is to be a manual instruction provided by the user 120. If to be automatically provided, operation 1922 adds the voice instruction 544 to the assistance action profile 504. However, if the voice instruction 544 is to be provided by the user 120, for example in real-time just prior to execution of the assistance action 442, then operation 1914 proceeds to operation 1916 that may set a delay timer for receipt of the voice instruction 544 from the user 120. Optionally, operation 1918 then adds a command to disable the soundwave damper 206 and/or allow for the pass-through sound 119 from the sound receiving environment 101.1. Operation 1918 proceeds to operation 1920, which determines whether a backup instance of the voice instruction 544 should be specified if the delay timer expires. If so, operation 1918 proceeds to operation 1922, whereas if no backup instance of the voice instruction 544 is to be provided (e.g., in this case the voice controlled device may time out and the assistance action 442 may cease to execute) operation 1920 proceeds to operation 1910. Operation 1922 may add the break 1901C before returning to operation 1908 where an additional voice instruction 544 that ay be required for execution of the assistance application 440 may be specified.

An additional way to define the assistance action profile 504 of FIG. 5 is for the user 120 to record a version of execution of the assistance action 442 at the same time the user 120 executes the assistance action 442. For example, the user 120 may hold down a recording button on the voice controlled device and begin to speak according to the voice command protocol of the voice controlled device. The pass-through sound 119 may be initiated, with a simultaneous recording made of the user's voice speaking each instance of the invocation command 540, the initiation command 542, and the voice instruction 544. The recording may exclude the sound response 311 received by the voice controlled device in voice commands stored on the memory 203, either through the user 120 releasing pressure from the button during the response or through other means.

FIG. 20 is an automated assistance action initiation process flow illustrating a process by which a specific instance of the assistance action profile 504 of FIG. 5 and/or FIG. 19 may be defined and/or triggered upon occurrence of the initiation condition 502, according to one or more embodiments. Operation 2000 specifies an assistance application 440 accessible through a voice controlled assistance device 400 to be invoked by an invocation command 540 of the assistance application 440 communicated to the voice controlled assistance device 400.

Operation 2002 specifies an assistance action 442 of the assistance application 440, the assistance action 442 conforming to a command protocol (e.g., a voice command protocol) specifying predefined actions executable by the assistance application 440 following invocation of the assistance application 440, wherein the assistance action 442 executable after one or more voice instructions 544 associated with the assistance action are provided (e.g., in response to the voice input 444) following initiation of the assistance action 442. Operation 2004 specifies the one or more voice instructions 544 associated with the assistance action 442. Operation 2006 optionally associates a time delay between the invocation command 540 of the assistance application 440 or the initiation command 542 of the assistance action 442, and/or at least one of the one or more voice instructions 544. Operation 2008 selects an initiation condition 502 to invoke the assistance application 440 and initiate the assistance action 442. Operation 2010, upon determination of occurrence of the trigger condition, serially communicates the invocation command 540 of the assistance application 440, the initiation command 542 of the assistance action 442, and the one or more voice instructions 544 to the voice controlled assistance device 400 to invoke the assistance application 440 and execute the assistance action 442. Operation 2012 optionally determines a verbal response (e.g., the sound response 311) of the voice controlled assistance device 400 has terminated before initiation of the initiation command 542 of the assistance action 442, and/or at least one of the one or more voice instructions 544.

A specific example of one or more of the present embodiments will now be described. Ted and Shannon are a technology-savvy married couple with one small daughter, Lisa. They own two voice controlled assistance devices each connecting to a different artificial intelligence assistant (e.g., Apple Siri, Amazon Alexa). They may have two devices because some of their favorite assistance applications (e.g., Skills, procedures that interact with a specific product line) are only available through one artificial intelligence assistant, while others that they like to use are only available through the second artificial intelligence assistant. Ted has a fancy connected coffee machine that responds to voice commands from the first assistance device. For example, he can say "make me a large coffee" as he is getting out of bed and the coffee machine will begin operation. It asks him for additional voice inputs such as "would you like flavoring with that?" Ted may respond with the voice instruction "Hazelnut." Ted also has an automobile with an internet connection to the second assistance device. He can tell the automobile to warm up in the morning, turn on the heater or air conditioner, and/or turn on his favorite music. However, this takes significant time to speak all of these commands in the right order, and Ted has to remember each voice command and how to provide instructions when asked for voice inputs.

While Shannon loves technology she is also concerned about the family's privacy, for example where personal data is sent to a third-party cloud computing provider. She has read that voice controlled assistance devices may periodically or continuously transmit sound for voice analysis even when not in active use, transmitting recorded sound of a home environment. She has also noticed that the family's voice controlled assistant devices are inadvertently triggered, for example by TV commercials. One time a package arrived which Shannon had not ordered because a TV show host—as a joke—announced a voice command on the TV show for ordering the novelty product from the voice controlled assistance service. Further, Shannon is concerned because Lisa is just learning to speak. While many appliances are still too high off of the ground for Lisa to physically reach, Lisa is observing her parents control many of their household devices through voice.

Ted and Shannon decide to implement the sound interface device 200 to give them enhanced control, customization, and/or security of their voice controlled assistance devices. The specific model of the sound interface device 200 has two receiving docks and a configuration lock that keeps both of their voice controlled assistance devices bound to the sound interface device. The sound receiving capabilities of the voice controlled assistant devices are reduced by sound damping of the sound interface device 200 such that the devices will only receive and process sound from someone who is standing next to the voice controlled assistant devices and speaking very loudly and clearly. The soundwave damper utilizes a flexible rubber membrane that surrounds the receiving microphone of each voice controlled assistance device, plus a white noise generator (e.g., the sound interference generator 1000 of FIG. 10A and FIG. 10B). Ted sets up an assistance action profile (e.g., the assistance action profile 504) that first invokes his coffee machine's assistance application, then initiatives an assistance action such as starting to make his cup of coffee, then providing voice instructions to requested voice inputs such as the Hazelnut additive. Ted also follows a similar procedure for his connected automobile application even though it is accessible through a different voice controlled assistance device. He sets up an assistance action profile that automatically will start his automobile, turn on the heated driver-side seat, and turn on his favorite morning news broadcast on satellite radio. Finally, Ted associates the two profiles such that they run in sequence when he says the custom command phrase "Start my day right". Ted changes the phrase periodically so Lisa does not learn it.

As a result of the sound interface device, Ted is able to carry out multiple actions with a single command, and does not need to remember the invocation commands, initiation commands, or to laboriously go through each voice instruction he once had to provide. At the same time, Ted or Shannon can instruct the sound interface device to "turn off damping" and it will pass through all communications from the sound receiving environment of the sound interface device, either to one or both voice controlled assistance devices. Shannon is happy because Ted can change his morning custom command phrase periodically so Lisa does not learn the command phrase, nor is Lisa exposed to the command phrases of the voice command protocols that Ted and Shannon have no power to change (e.g., default command protocols provided by the voice assistance device). Shannon is also happy because the sound damping prevents the voice controlled assistance devices from surreptitiously listening in on their home environment or from executing unwanted sound commands that may come from the television or radio.

Although the present embodiments have been described with reference to specific example embodiments, it will be evident that various modifications and changes may be made to these embodiments without departing from the broader spirit and scope of the various embodiments. For example, the various devices, engines, algorithms and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application-specific integrated (ASIC) circuitry and/or Digital Signal Processor (DSP) circuitry). For example, each processor and memory may be implemented as one or more processing units (e.g., processing cores) and/or one or more memory units, respectively.

In addition, it will be appreciated that the various operations, processes and methods disclosed herein may be embodied in a non-transitory machine-readable medium and/or a machine-accessible medium compatible with a data processing system (e.g., the sound interface device 200, the sound controlled device 300, voice controlled device that is a specific instance of the sound controlled device 300 that is controlled by vice, the voice controlled assistance device 400, the server 350, the server 450, the server 500, the mobile device 122). Accordingly, the specification and drawings are to be regarded in an illustrative rather than a restrictive sense.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

What is claimed is:

1. An apparatus comprising:
   a signal input for receiving a command signal;
   a soundwave damper to dampen a sound receiving capability of a voice controlled device capable of initiating at least one of a responsive action of the voice controlled device in response to a voice command received on a microphone of the voice controlled device and a speech response of the voice controlled device in response to the voice command;
   a processor;
   a memory comprising:
      an audio file encoding the voice command, and
      computer-executable instructions that when executed on the processor cause the processor to at least one of:
         (i) transmit the command signal to a server for a determination that the command signal is associated with the voice command, and receive at least one of the voice command and the determination that the command signal is associated with the voice command; and
         (ii) determine the command signal is associated with the voice command, and in response to a determination of input of the command signal, generate with a speaker a soundwave carrying the voice command capable of initiating at least one of the responsive action of the voice controlled device and the speech response of the voice controlled device;
      the speaker, to bypass the soundwave damper such that the soundwave carrying the voice command is communicable to the microphone of the voice controlled device, and
      a cap that houses the speaker and optionally the soundwave damper.

2. The apparatus of claim 1, wherein the voice controlled device is a voice controlled assistance device.

3. The apparatus of claim 1, wherein at least the processor and the memory are housed in a mobile device.

4. The apparatus of claim 1, further comprising:
   a network interface controller,
      wherein the signal input is the network interface controller,
      the memory further comprising computer-executable instructions that when executed on the processor cause the processor to:
         associate the command signal with the voice command; and
         receive the command signal from a mobile device through the network interface controller.

5. The apparatus of claim 1, further comprising:
   a base,
   an adjustable connector connecting the base and a cap and configured to allow the speaker and the soundwave damper to be adjusted proximate to the microphone of the voice controlled device, and
   a configuration lock for securing a configuration of the adjustable connector.

6. The apparatus of claim 4, wherein the cap comprises a coupling to attach the cap to the voice controlled device such that the speaker is communicatively coupled to the microphone of the voice controlled device.

7. The apparatus of claim 1, wherein the soundwave damper is a barrier shielding the microphone of the voice controlled device, reducing an ordinary sound receiving environment of the voice controlled device.

8. The apparatus of claim 7, wherein the barrier is a flexible membrane forming a seal around the microphone of the voice controlled device.

9. The apparatus of claim 1, wherein the soundwave damper is a sound interference generator.

10. The apparatus of claim 1 wherein the voice controlled device is a first voice controlled device and the apparatus of claim 1 further comprises:
    a second speaker, and
    a second soundwave damper dampening a second voice controlled device,
    wherein the memory further comprising computer-executable instructions that when executed on the processor cause the processor to:
       determine a relation data between the command signal and the first voice controlled device such that the first voice controlled device is to primarily receive the voice command associated with the command signal.

11. A method comprising:
    dampening with a soundwave damper a sound receiving capability of a voice controlled assistance device having a microphone;
    receiving a command signal;
    executing computer readable instructions to determine that the command signal is associated by a relation data to a voice command, the voice command stored as an audio file in a memory;
    in response to the command signal, generating with a speaker a soundwave carrying the voice command,
       wherein the voice command capable of initiating at least one of a response action of the voice controlled assistance device and a speech response of the voice controlled assistance device; and
    bypassing the soundwave damper to communicate the soundwave carrying the voice command from the speaker to the microphone of the voice controlled assistance device.

12. The method of claim 11, further comprising:
    utilizing the audio file to generate the soundwave carrying the voice command.

13. The method of claim 12, further comprising:
    processing at the voice controlled assistance device the soundwave carrying the voice command and communicating the voice command to a server comprising a speech recognition engine over a wide area network for recognition of the voice command and execution of the at least one of the response action of the voice controlled assistance device associated with the voice command and the speech response of the voice controlled assistance device associated with the voice command.

14. The method of claim 12, the method further comprising:
processing the speech response at the voice controlled assistance device and generating a third soundwave carrying the speech response.

15. The method of claim 14, further comprising:
in response to the command signal, permitting a verbal communication of a user received from a damped region of an ordinary sound receiving environment of the voice controlled assistance device to be reproduced by the speaker that bypasses the soundwave damper such that the verbal communication passes substantially unimpeded from the damped region to the microphone of the voice controlled assistance device.

16. The method of claim 12, further comprising:
setting the command signal in the memory based on receiving the command signal from a mobile device,
wherein the soundwave damper is at least one of (i) a barrier shielding the microphone of the voice controlled assistance device, and (ii) a sound interference generator,
wherein a determination that the command signal is associated with the voice command to which the voice controlled assistance device is responsive is made by a sound interface device comprising the speaker and the soundwave damper communicatively coupled to the voice controlled assistance device through sound,
wherein the voice command is a wake word and a responsive action is an activation of the voice controlled assistance device, and
wherein the command signal is a text string data further comprising the voice command of the voice controlled assistance device.

17. The method of claim 11, further comprising:
in response to the command signal, reducing a strength of the soundwave damper to increase a sound receiving environment of the voice controlled assistance device relative to an ordinary sound receiving environment of the voice controlled assistance device;
determining the command signal is exclusively associated with the voice controlled assistance device when two or more voice controlled assistance devices are suppressed with a sound damping to reduce a sound receiving environment of the two or more voice controlled assistance devices;
routing an audio signal usable by the speaker to generate the soundwave carrying the voice command when it is determined that the command signal is associated with the voice controlled assistance device when the two or more voice controlled assistance devices are suppressed with the sound damping to reduce the sound receiving environment of the two or more voice controlled assistance devices;
determining a response failure from the voice controlled assistance device;
determining the command signal is associated with a backup device of the two or more voice controlled assistance devices;
generating a second audio signal usable by at least one of the speaker and a second speaker to generate at least one of the soundwave carrying the voice command and a second soundwave carrying a second voice command to the backup device of the two or more voice controlled assistance devices; and
at least one of re-routing the audio signal and routing the second audio signal to at least one of the speaker and the second speaker to communicate at least one of the voice command and the second voice command to the backup device of the two or more voice controlled assistance devices.

18. A system comprising:
a sound controlled device communicatively coupled to a sound recognition engine, the sound controlled device comprising:
a processor of the sound controlled device,
a memory of the sound controlled device, and
a microphone of the sound controlled device for receiving a sound command conforming to a sound command protocol to be received at the microphone of the sound controlled device; and
a sound interface device communicatively coupled to the sound controlled device, comprising:
a processor of the sound interface device,
a memory of the sound interface device,
a speaker of the sound interface device to generate the sound command conforming to the sound command protocol for receipt at the microphone of the sound controlled device,
an audio input interface, and
a soundwave damper to reduce a sound receiving capability of the microphone of the sound controlled device from a user within an ordinary sound receiving environment of the sound controlled device by disrupting a soundwave communication medium.

19. The system of claim 18, further comprising:
a network;
a server, comprising:
a processor of the server,
a memory of the server,
the sound recognition engine, and
an assistance service engine;
the sound controlled device further comprising:
a network interface controller for communication with the server over the network;
the sound interface device further comprising:
a wireless communication module of the sound interface device,
the memory of the sound interface device comprising the sound signature stored as a first audio file, the sound command stored as a second audio file, a relation data between the first audio file and the second audio file, and computer-executable instructions that when executed on the processor of the sound interface device cause the processor of the sound interface device to:
upon determination of a threshold similarity between an audio signal and a sound signature, convert the second audio file into a second audio signal and generate with the speaker a soundwave carrying the sound command, and
a mobile device comprising:
a processor of the mobile device;
a memory of the mobile device comprising computer executable instructions that when executed on the processor of the mobile device cause the processor of the mobile device to record the first audio file; and
a wireless communication module of the mobile device to communicate the first audio file to the sound interface device.

20. The system of claim 19, further comprising:
the sound controlled device further comprising:
- a text-speech converter,
    - wherein the soundwave damper is at least one of (i) a barrier shielding the microphone of the sound controlled device, and (ii) a sound interference generator,
    - wherein the sound interface device is communicatively coupled to the sound controlled device through a one-way communication generated by the speaker of the sound interface device and received by the microphone of the sound controlled device, and
    - wherein the sound controlled device is a voice controlled assistance device.

* * * * *